United States Patent
Pandit et al.

(10) Patent No.: US 12,444,302 B2
(45) Date of Patent: Oct. 14, 2025

(54) APPLICATION MONOLOGUE FOR SELF-DRIVING VEHICLES

(71) Applicant: WAYMO LLC, Mountain View, CA (US)

(72) Inventors: Salil Pandit, Palo Alto, CA (US); Nirmal Patel, Sunnyvale, CA (US); Renaud-Roland Hubert, Gilroy, CA (US); Maria Moon, Mountain View, CA (US); Lauren Schwendimann, Burlingame, CA (US); Guilherme Villar, San Francisco, CA (US); Ryan Powell, San Francisco, CA (US); Peter Crandall, San Jose, CA (US); Matthew Corey Hall, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 18/921,520

(22) Filed: Oct. 21, 2024

(65) Prior Publication Data

US 2025/0061806 A1    Feb. 20, 2025

Related U.S. Application Data

(63) Continuation of application No. 18/200,261, filed on May 22, 2023, which is a continuation of application
(Continued)

(51) Int. Cl.
*G08G 1/123* (2006.01)
*G06Q 50/40* (2024.01)
*H04W 4/40* (2018.01)

(52) U.S. Cl.
CPC ............ *G08G 1/123* (2013.01); *G06Q 50/40* (2024.01); *H04W 4/40* (2018.02)

(58) Field of Classification Search
CPC . B60Q 5/005; B60R 16/0231; B60R 21/2015; B60W 30/09; B60W 30/181;
(Continued)

(56) References Cited

U.S. PATENT DOCUMENTS 8,676,431 B1    3/2014   Mariet et al.
9,443,426 B1    9/2016   Formwalt
(Continued)

FOREIGN PATENT DOCUMENTS

CN    108205830 A    6/2018
CN    108474665 A    8/2018
(Continued)

OTHER PUBLICATIONS

Office Action for European Patent Application No. 20208143.6, Mar. 10, 2023.
(Continued)

*Primary Examiner* — Stephen R Burgdorf
(74) *Attorney, Agent, or Firm* — Botos Churchill IP Law LLP

(57) ABSTRACT

The technology includes communicating the current status of a self-driving vehicle to users, such as passengers within the vehicle and other users awaiting pickup. Certain information about the trip and vehicle status is communicated depending on where the passenger is sitting within the vehicle or where the person awaiting pickup is located outside the vehicle. This includes disseminating the "monologue" of a vehicle operating in an autonomous driving mode to a user via an app on the user's device (e.g., mobile phone, tablet or laptop PC, wearable, or other computing device) and/or an in-vehicle user interface. The monologue includes current status information regarding driving decisions and related operations or actions. This alerts the user as to why the vehicle is taking (or not taking) a certain
(Continued)

action, which reduces confusion and allows the user to focus on other matters.

20 Claims, 16 Drawing Sheets

Related U.S. Application Data

No. 16/710,113, filed on Dec. 11, 2019, now Pat. No. 11,705,002.

(58) Field of Classification Search
CPC .... B60W 50/08; B60W 50/14; B60W 60/001; G05D 1/0088; G05D 1/0212; G06Q 10/02; G06Q 50/30; G06Q 50/40; G08G 1/0962; G08G 1/123; G08G 1/133; G08G 1/202; H04W 4/40
USPC ........................................................ 340/994
See application file for complete search history.

(56) References Cited

U.S. PATENT DOCUMENTS

| | | | |
|---|---|---|---|
| 9,953,283 B2 | 4/2018 | Sweeney et al. | |
| 10,310,505 B1 | 6/2019 | Hanson et al. | |
| 10,372,130 B1 | 8/2019 | Kaushansky et al. | |
| 10,740,729 B1* | 8/2020 | Leary | H04W 4/029 |
| 10,872,381 B1 | 12/2020 | Leise et al. | |
| 2007/0052586 A1 | 3/2007 | Horstemeyer | |
| 2009/0118970 A1 | 5/2009 | Daum et al. | |
| 2010/0117816 A1 | 5/2010 | Okada | |
| 2012/0259706 A1 | 10/2012 | Lobaza et al. | |
| 2013/0093890 A1* | 4/2013 | Cunningham | G08G 1/096783 348/148 |
| 2014/0227991 A1 | 8/2014 | Breton et al. | |
| 2014/0309789 A1 | 10/2014 | Ricci | |
| 2014/0309806 A1 | 10/2014 | Ricci | |
| 2015/0347075 A1 | 12/2015 | Levesque et al. | |
| 2016/0055750 A1 | 2/2016 | Linder et al. | |
| 2016/0059864 A1 | 3/2016 | Feit et al. | |
| 2016/0356603 A1 | 12/2016 | Hajj et al. | |
| 2017/0096235 A1 | 4/2017 | Thomas | |
| 2017/0293614 A1 | 10/2017 | Chen | |
| 2017/0300049 A1 | 10/2017 | Seally | |
| 2017/0316696 A1 | 11/2017 | Bartel | |
| 2018/0096597 A1* | 4/2018 | Mortazavi | H04W 4/023 |
| 2018/0126985 A1 | 5/2018 | Lee et al. | |
| 2018/0170392 A1 | 6/2018 | Yang et al. | |
| 2018/0261081 A1 | 9/2018 | Suzuki et al. | |
| 2018/0334161 A1 | 11/2018 | Mizuno et al. | |
| 2018/0365908 A1 | 12/2018 | Liu et al. | |
| 2019/0017839 A1 | 1/2019 | Eyler et al. | |
| 2019/0094859 A1 | 3/2019 | Nix et al. | |
| 2019/0130745 A1 | 5/2019 | Turato | |
| 2019/0186939 A1 | 6/2019 | Cox et al. | |
| 2019/0265703 A1 | 8/2019 | Hicok et al. | |
| 2019/0310627 A1 | 10/2019 | Halder | |
| 2019/0390963 A1 | 12/2019 | Kumar et al. | |
| 2020/0041997 A1* | 2/2020 | Tuukkanen | A61B 5/024 |
| 2020/0092837 A1 | 3/2020 | Hartley | |
| 2020/0139812 A1 | 5/2020 | Johnson | |
| 2020/0257299 A1 | 8/2020 | Wang et al. | |
| 2020/0298801 A1 | 9/2020 | Dingli | |
| 2023/0341854 A1 | 10/2023 | Lennie et al. | |

FOREIGN PATENT DOCUMENTS

| | | | | |
|---|---|---|---|---|
| CN | 108885773 A | | 11/2018 | |
| CN | 111429730 A | * | 7/2020 | ............ G08G 1/085 |
| ES | 2436105 T3 | * | 12/2013 | ............ G08G 1/20 |
| JP | 2014048859 A | | 3/2014 | |
| WO | 2019152471 A2 | | 8/2019 | |

OTHER PUBLICATIONS

The First Office Action for Chinese Patent Application No. 202011460417.8, Jun. 1, 2023, 18 Pages.

The Extended European Search Report for EP Application No. 20208143.6 dated Apr. 19, 2021, EPO, Munich, Germany.

The Extended European Search Report for European Patent Application No. 24198738.7, Nov. 21, 2024, 9 Pages.

* cited by examiner

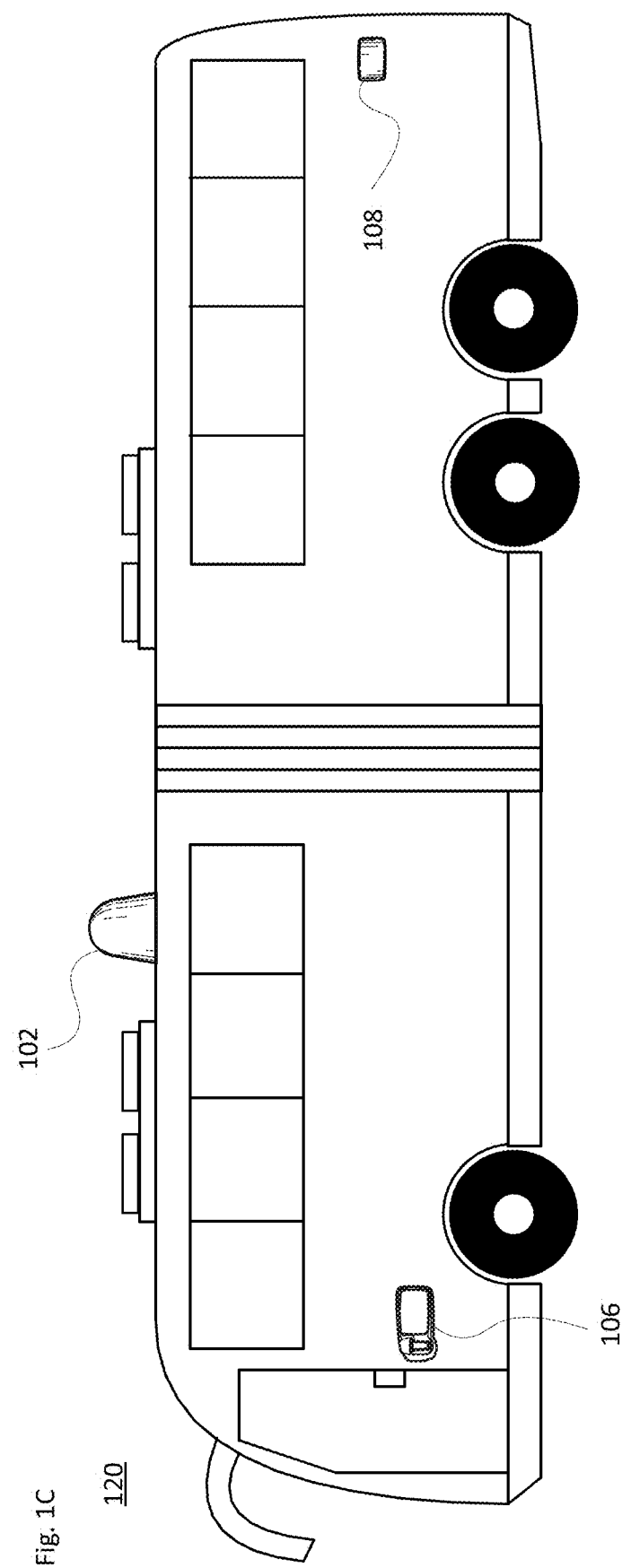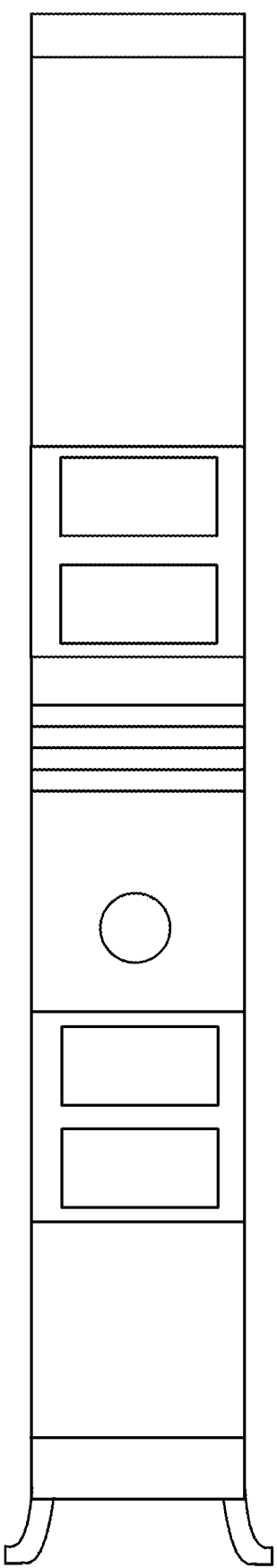

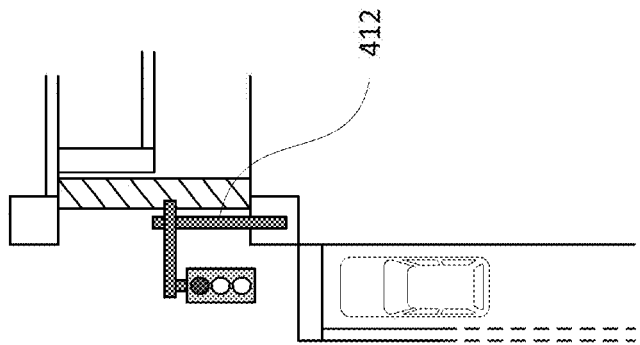
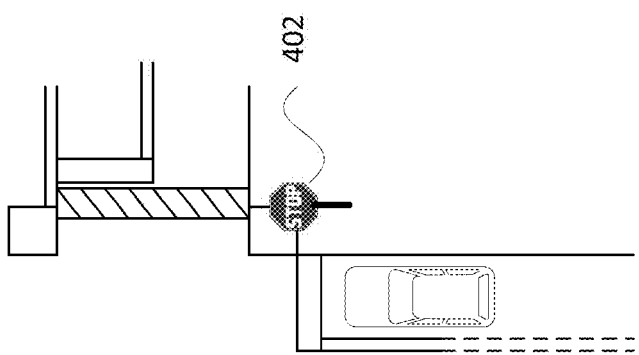
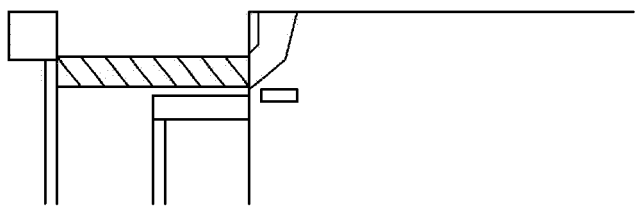
Fig. 4B  410
Fig. 4A  400

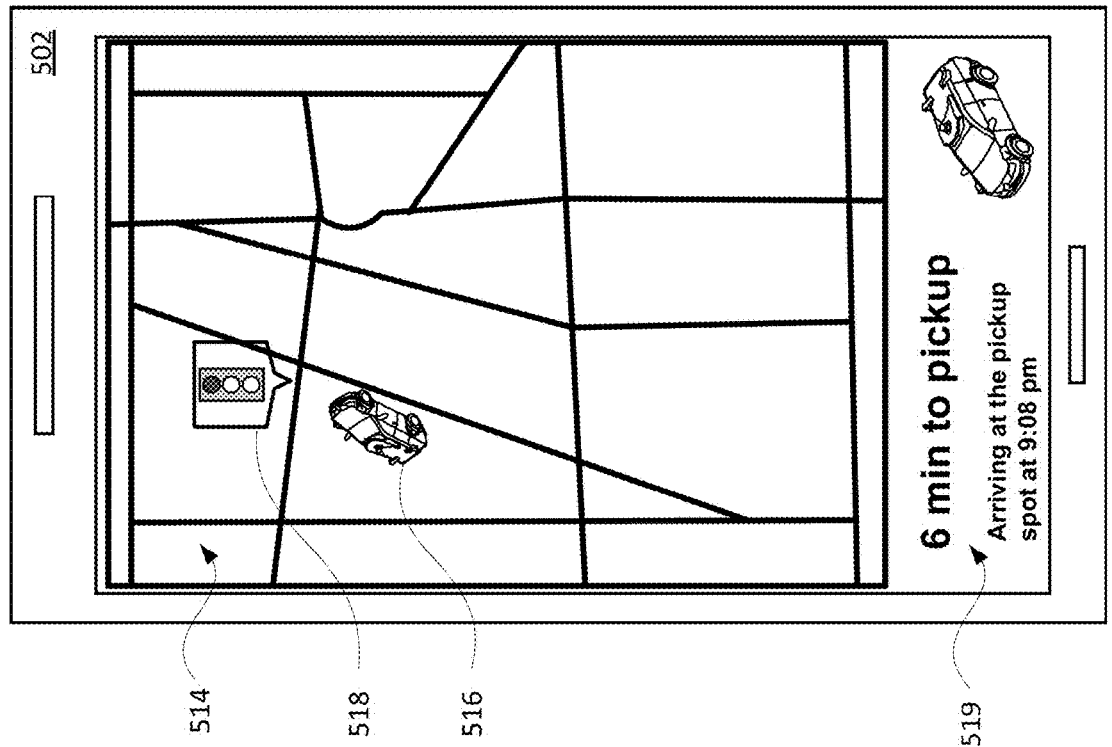

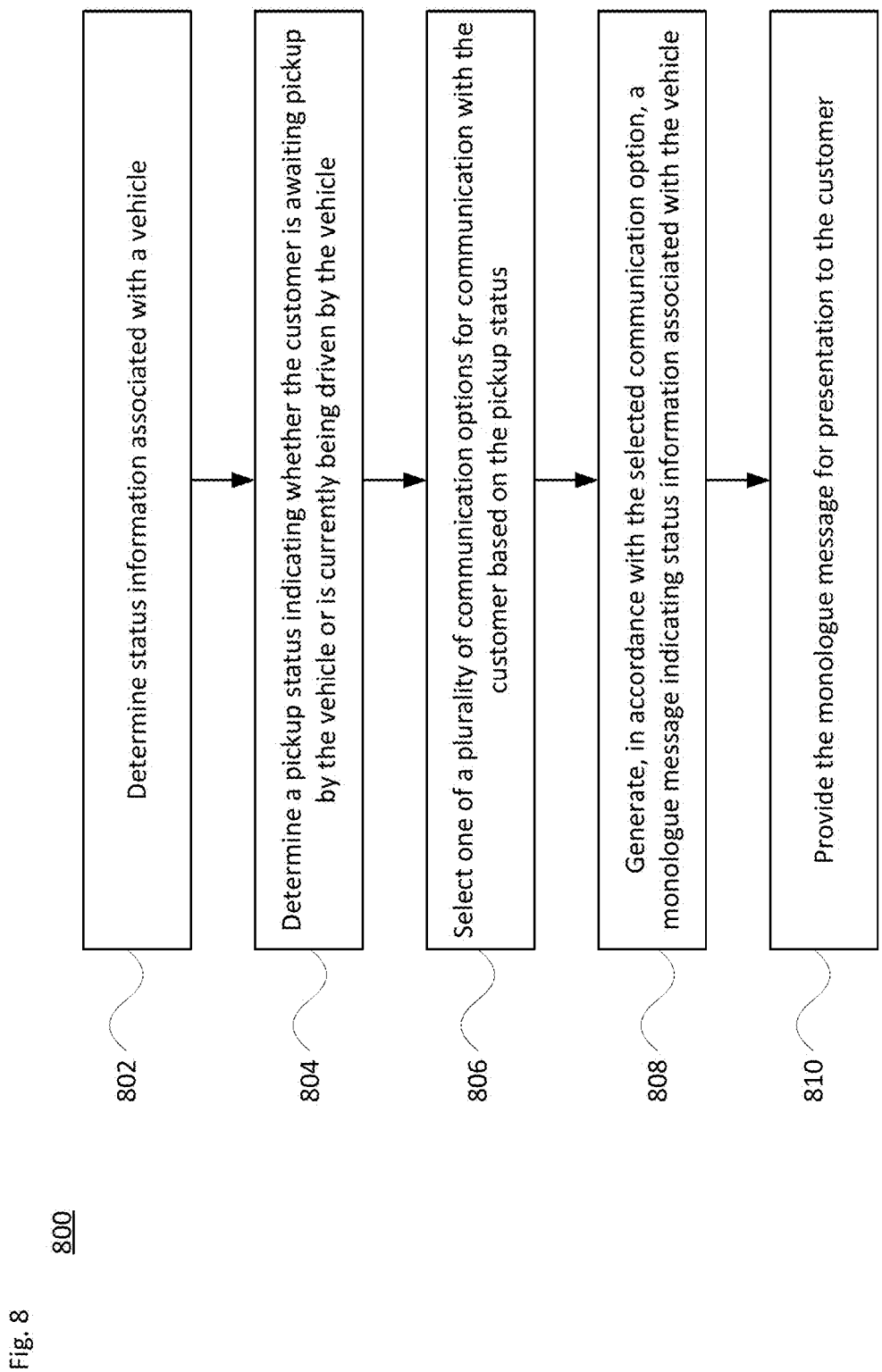

802 Determine status information associated with a vehicle

804 Determine a pickup status indicating whether the customer is awaiting pickup by the vehicle or is currently being driven by the vehicle 806 Select one of a plurality of communication options for communication with the customer based on the pickup status 808 Generate, in accordance with the selected communication option, a monologue message indicating status information associated with the vehicle 810 Provide the monologue message for presentation to the customer

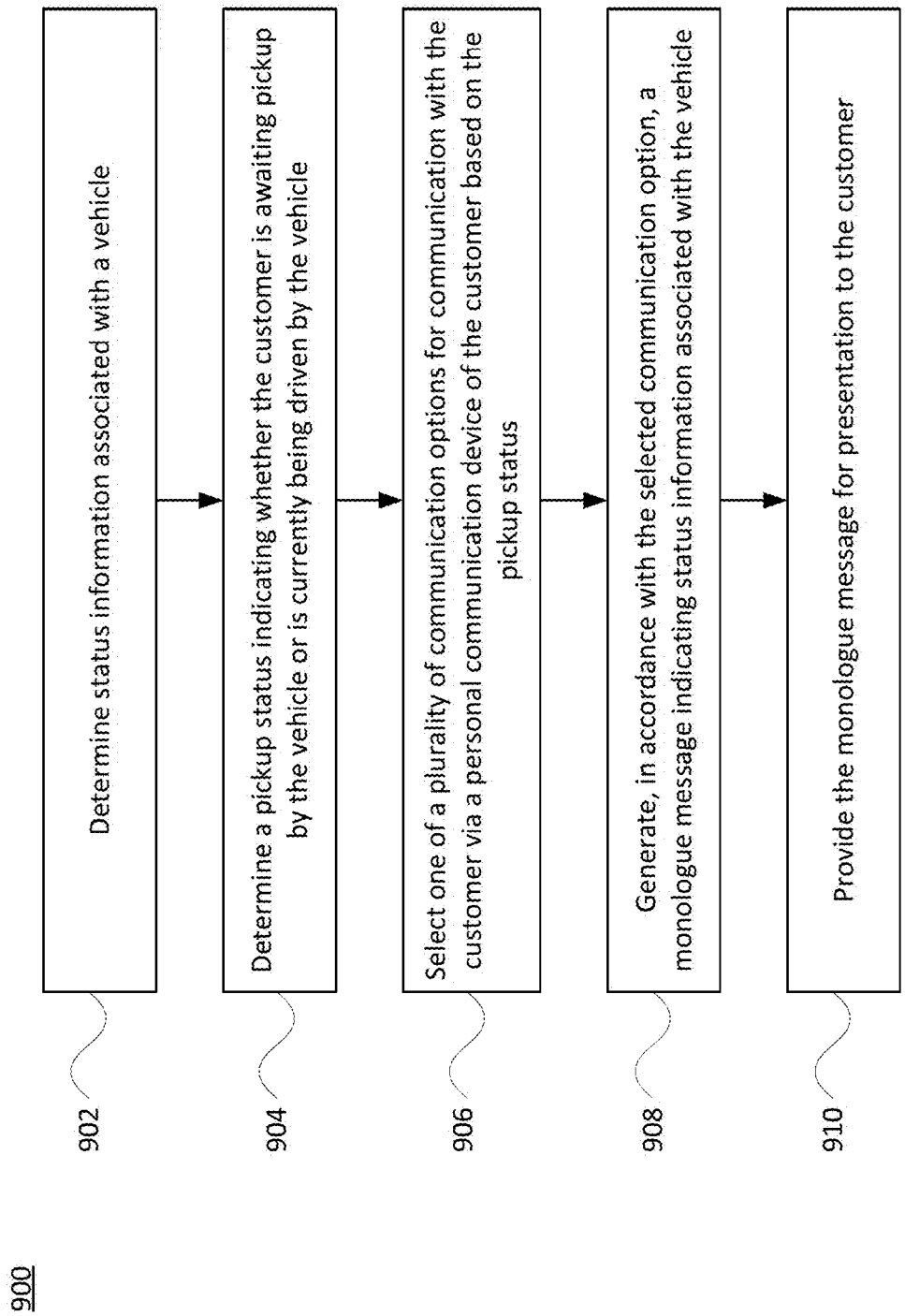

APPLICATION MONOLOGUE FOR SELF-DRIVING VEHICLES

CROSS-REFERENCE TO RELATED APPLICATIONS

This application is a continuation of U.S. application Ser. No. 18/200,261, filed May 22, 2023, which is a continuation of U.S. application Ser. No. 16/710,113, filed on Dec. 19, 2019, issued as U.S. Pat. No. 11,705,002 on Jul. 18, 2023, the entire disclosures of which are incorporated herein by reference.

BACKGROUND

Autonomous vehicles, such as vehicles that do not require a human driver, can be used to aid in the transport of passengers from one location to another. Such vehicles may operate in a fully autonomous mode without a person providing driving input. In this driving mode, the vehicle may make a variety of driving decisions. However, a passenger or a person awaiting pickup may not be aware of why the vehicle is operating in a certain manner. This can cause confusion and become a distraction.

BRIEF SUMMARY

The technology relates to communicating the current status of a self-driving vehicle to users (customers), including passengers within the vehicle and users awaiting pickup. Certain information may be presented to passengers and other users via vehicle display components (e.g., internal display screens or external signage). The type(s) of information and how it is communicated may depend on where the passenger is sitting within the vehicle (e.g., front seat v. rear seat) or where the person awaiting pickup is located outside the vehicle.

According to one aspect, a method of operation comprises determining, by one or more processors of a vehicle operating in an autonomous driving mode, status information associated with the vehicle; determining, by the one or more processors, a pickup status of a customer, the pickup status indicating whether the customer is awaiting pickup by the vehicle or is currently being driven by the vehicle in the autonomous driving mode; selecting, by the one or more processors, one of a plurality of communication options for communication with the customer based on the pickup status; generating, by the one or more processors in accordance with the selected communication option, a monologue message indicating status information associated with the vehicle; and providing the monologue message for presentation to the customer.

The status information may be a current driving status of the vehicle, in which the monologue message indicates the current driving status. For instance, the current driving status may be that the vehicle is waiting to perform a driving action based on an event or activity in an external driving environment. Here, the vehicle may be waiting to perform the driving action either in response to a traffic signal status or while obeying a traffic signal.

In one example, when the pickup status indicates that the customer is awaiting pickup, providing the monologue message for presentation to the customer includes transmitting the monologue message from the vehicle to a user device of the customer. In another example, when the pickup status indicates that the customer is being driven by the vehicle, providing the monologue message for presentation to the customer includes generating at least one of visual or acoustical information via an in-vehicle user interface system. Providing the monologue message for presentation to the customer may further include transmitting the monologue message from the vehicle to a user device of the customer. Alternatively or additionally, the method may also include receiving a query from the customer based on presentation of the monologue message and, in response to the query, providing additional information to the customer via the in-vehicle user interface system. Here, the additional information may include contextual text, imagery or audible information regarding the query for the monologue message.

In a further example, generating the monologue message includes selecting graphical information for presentation to the customer based on a ranked list of monologue data. The list of monologue data may be ranked based on a hierarchical order of (i) features that make the vehicle stop driving, (ii) features that the vehicle predicts will cause a pause in driving exceeding a threshold amount of time, (iii) features that cause the vehicle to move at lower than a posted speed, and (iv) features that may cause the vehicle to deviate from a planned course of action. Alternatively or additionally, selecting based on the ranked list may be based on at least one of time or distance information associated with a current or upcoming trip by the customer in the vehicle.

And in yet another example, when the pickup status indicates that the customer is being driven by the vehicle, providing the monologue message for presentation to the customer includes selecting monologue message details based on where in the vehicle the customer is sitting.

According to another aspect, a method of operation includes determining, by one or more processors, status information associated with a vehicle operating in an autonomous driving mode; determining, by the one or more processors, a pickup status of a customer, the pickup status indicating whether the customer is awaiting pickup by the vehicle or is currently being driven by the vehicle in the autonomous driving mode; selecting, by the one or more processors based on the pickup status, one of a plurality of communication options for communication with the customer via a personal communication device of the customer; generating, by the one or more processors in accordance with the selected communication option, a monologue message indicating status information associated with the vehicle; and providing the monologue message for presentation to the customer via the personal communication device.

In one example, a first one of the one or more processors is a processing device of the vehicle. In another example, a first one of the one or more processors is a processing device of a remote server in operative communication with the vehicle. Here, a second one of the one or more processors may be a processing device of the vehicle. In this case, the method further comprises: the first processor generating a first set of information for the monologue message; and the second processor generating a second set of information for the monologue message.

In a further example, a first one of the one or more processors is a processing device of the personal communication device. In this case, the method further comprises the processing device selecting information received from at least one of the vehicle or a remote server for presentation in the monologue message.

In one scenario, when the pickup status indicates that the customer is being driven by the vehicle, selecting one of the plurality of communication options further includes selecting to present the monologue message to the customer via an in-vehicle user interface system in addition to presenting via the personal communication device. This process may further comprise providing additional information to the customer via the in-vehicle user interface system, in which the additional information includes contextual text, imagery or audible information regarding a query about the monologue message.

And in another example, the status information is a current driving status of the vehicle, and the monologue message indicates the current driving status.

BRIEF DESCRIPTION OF THE DRAWINGS

FIGS. 1C-D illustrate an example articulated bus arrangement for use with aspects of the technology.

FIGS. 4A-B illustrate different map examples in accordance with aspects of the technology.

FIGS. 5A-B illustrate user device graphical interfaces in accordance with aspects of the technology.

FIG. 8 illustrates an example method in accordance with aspects of the technology.

FIG. 9 illustrates another example method in accordance with aspects of the technology.

DETAILED DESCRIPTION

Aspects of the technology involve disseminating the "monologue" of a vehicle operating in an autonomous driving mode to a user via an app on the user's device (e.g., mobile phone, tablet or laptop PC, wearable, or other computing device) and/or an in-vehicle user interface. As discussed further below, the monologue includes current status information regarding driving decisions and related operations or actions. This alerts the user as to why the vehicle is taking (or not taking) a certain action, which reduces confusion and allows the user to focus on other matters.

Example Vehicle Systems

Figure 1A:
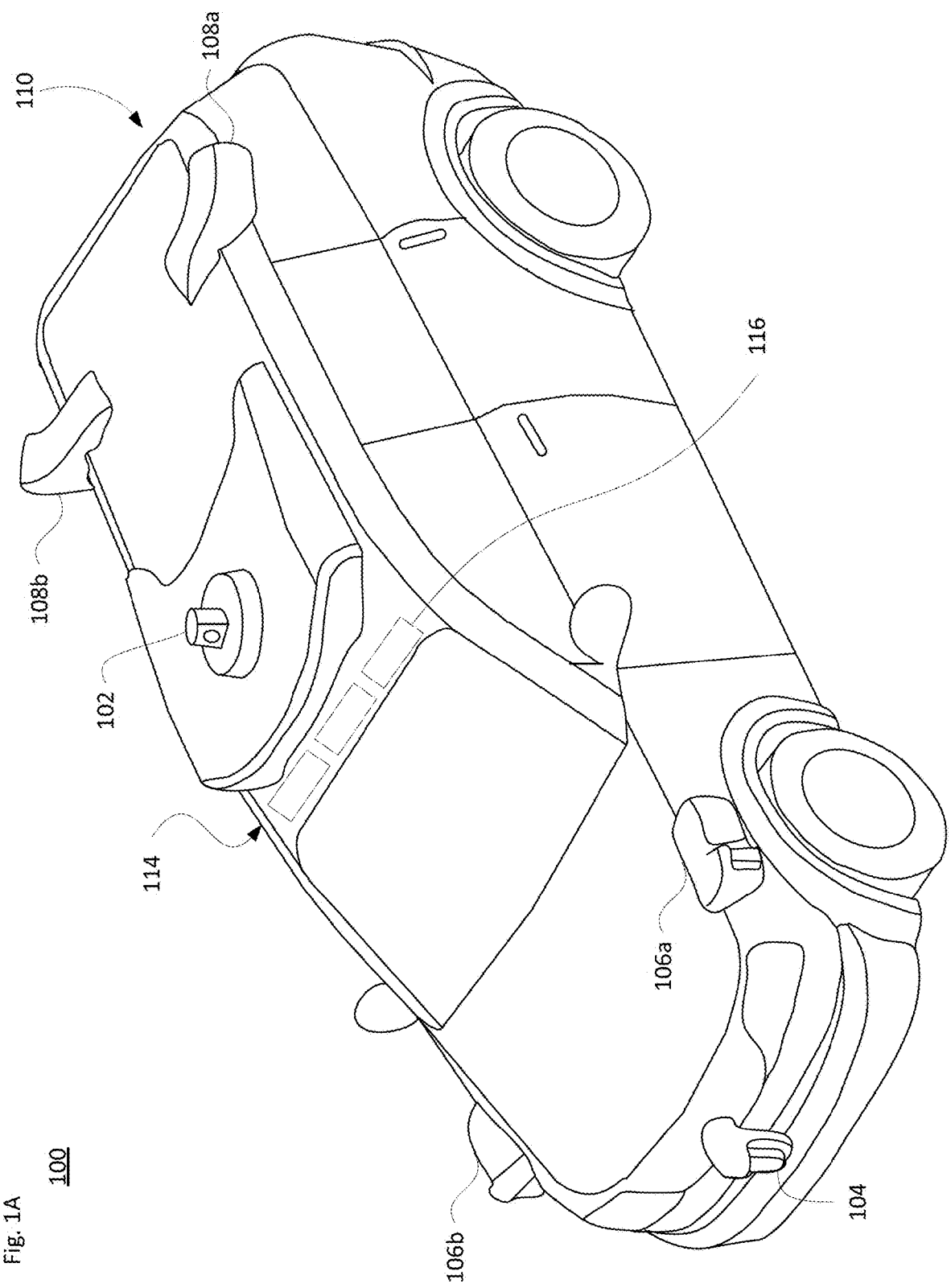
FIGS. 1A-B illustrate an example passenger-type vehicle configured for use with aspects of the technology.
Figure 1B:
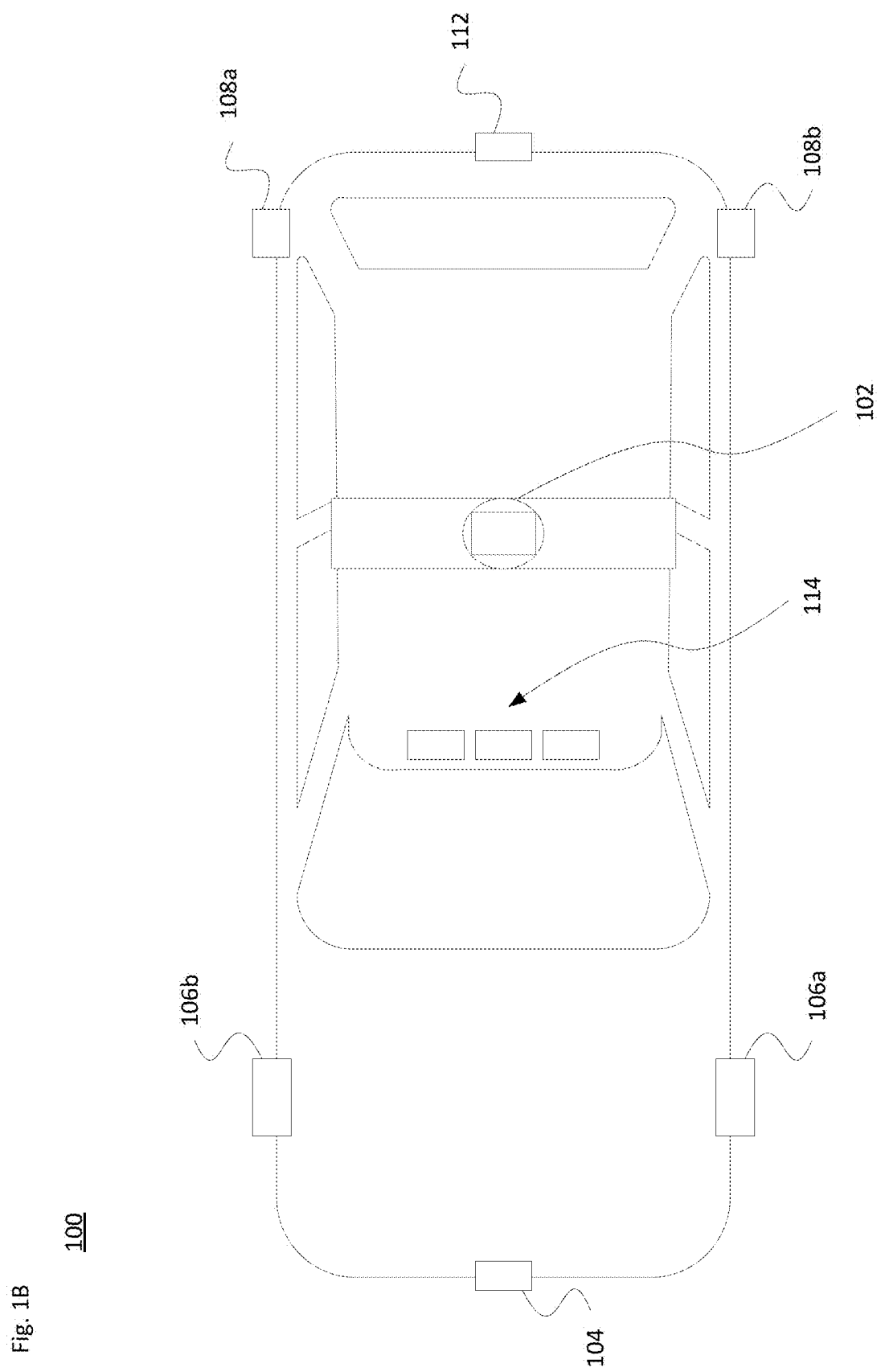

FIG. 1A illustrates a perspective view of an example passenger vehicle 100, such as a minivan, sport utility vehicle (SUV) or other vehicle. FIG. 1B illustrates a top-down view of the passenger vehicle 100. As shown, the passenger vehicle 100 includes various sensors for obtaining information about the vehicle's external environment, which enable the vehicle to operate in an autonomous driving mode. For instance, a roof-top housing 102 may include a lidar sensor as well as various cameras, radar units, infrared and/or acoustical sensors. Housing 104, located at the front end of vehicle 100, and housings 106a, 106b on the driver's and passenger's sides of the vehicle, may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (112 in FIG. 1B) may be positioned along the rear of the vehicle 100, such as on or adjacent to the bumper. And arrow 114 indicates a series of sensor units 116 arranged along a forward-facing direction of the vehicle. In some examples, the passenger vehicle 100 also may include various sensors for obtaining information about the vehicle's interior spaces (not shown).

FIGS. 1C-D illustrate an example of another type of vehicle 120, such as an articulated bus. As with the passenger vehicle 100, the articulated bus 120 may include one or more sensor units disposed along different areas of the vehicle.

By way of example, each sensor unit may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors). While certain aspects of the disclosure may be particularly useful in connection with specific types of vehicles, the vehicle may be any type of vehicle including, but not limited to, cars, trucks, motorcycles, buses, recreational vehicles, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. Level 2 has partial automation of certain driving operations, while Level 3 involves conditional automation that can enable a person in the driver's seat to take control as warranted. In contrast, Level 4 is a high automation level where the vehicle is able to drive fully autonomously without human assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

Figure 2:
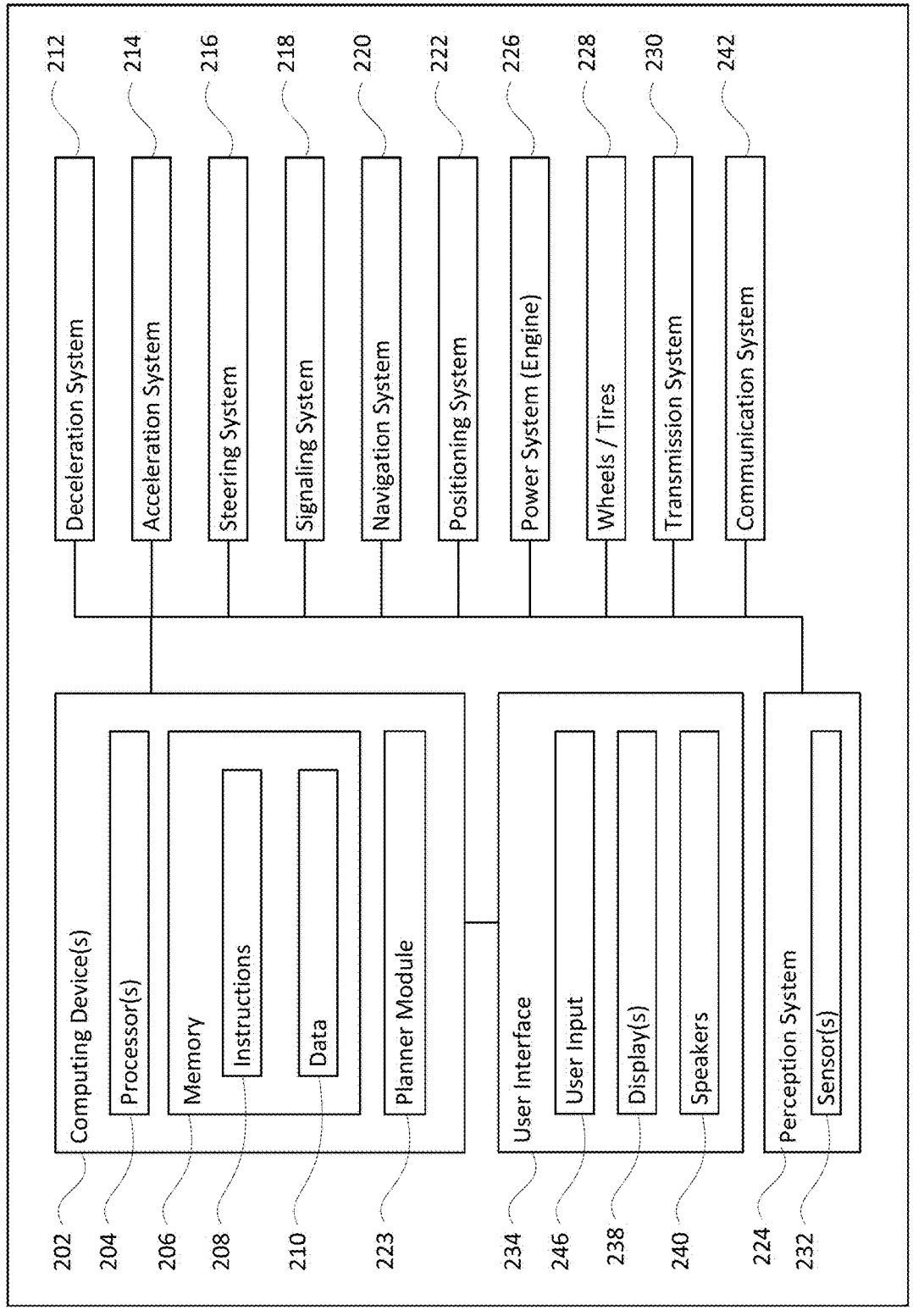
FIG. 2 is a block diagram of systems of an example vehicle in accordance with aspects of the technology.

FIG. 2 illustrates a block diagram 200 with various components and systems of an exemplary vehicle, such as passenger vehicle 100 or bus 120, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210 may be retrieved, stored or modified by one or more processors 204 in accordance with the instructions 208. In one example, some or all of the memory 206 may be an event data recorder or other secure data storage system configured to store vehicle diagnostics and/or obtained sensor data, which may be on board the vehicle or remote, depending on the implementation.

The processors 204 may be any conventional processors, such as commercially available CPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system is configured to communicate with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, e.g., including the vehicle's pose). The autonomous driving computing system may employ a planner module 223, in accordance with the navigation system 220, the positioning system 222 and/or other components of the system, e.g., for determining a route from a starting point to a destination or for making modifications to various driving aspects in view of current or expected traction conditions.

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a destination location completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways, lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The sensors 232 are located in one or more sensor units around the vehicle. The detected objects may be other vehicles, obstacles in the roadway, traffic signals, signs, trees, bicyclists, pedestrians, etc. The sensors 232 may also detect certain aspects of weather or other environmental conditions, such as snow, rain or water spray, or puddles, ice or other materials on the roadway.

By way of example only, the perception system 224 may include one or more light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, acoustical sensors (e.g., microphones or sonar transducers), and/or any other detection devices that record data which may be processed by computing devices 202. Such sensors of the perception system 224 may detect objects outside of the vehicle and their characteristics such as location, orientation, size, shape, type (for instance, vehicle, pedestrian, bicyclist, etc.), heading, speed of movement relative to the vehicle, etc.

The perception system 224 may also include other sensors within the vehicle to detect objects and conditions within the vehicle, such as in the passenger compartment. For instance, such sensors may detect, e.g., one or more persons, pets, packages, etc., as well as conditions within and/or outside the vehicle such as temperature, humidity, etc. This can include detecting where the passenger(s) is sitting within the vehicle (e.g., front passenger seat versus second or third row seat, left side of the vehicle versus the right side, etc.). The interior sensors may detect the proximity, position and/or line of sight of the passengers in relation to one or more display devices of the passenger compartment. Still further sensors 232 of the perception system 224 may measure the rate of rotation of the wheels 228, an amount or a type of braking by the deceleration system 212, and other factors associated with the equipment of the vehicle itself.

The raw data obtained by the sensors can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner module 223, including adjustments in operation to deal with occlusions and other issues. In addition, the computing devices 202 may perform calibration of individual sensors, all sensors in a particular sensor assembly, or between sensors in different sensor assemblies or other physical housings.

As illustrated in FIGS. 1A-B, certain sensors of the perception system 224 may be incorporated into one or more sensor assemblies or housings. In one example, these may be integrated into the side-view mirrors on the vehicle. In another example, other sensors may be part of the roof-top housing 102, or other sensor housings or units 106a,b, 108a,b, 112 and/or 116. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to passengers within the vehicle. By way of example, displays may be located, e.g., along the dashboard, on the rear of the front row of seats, on a center console between the front row seats, along the doors of the vehicle, extending from an armrest, etc. Other output devices, such as speaker(s) 240 may also be located within the passenger vehicle.

The passenger vehicle also includes a communication system 242. For instance, the communication system 242 may also include one or more wireless configurations to facilitate communication with other computing devices, such as passenger computing devices within the vehicle, computing devices external to the vehicle such as in another nearby vehicle on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

While the components and systems of FIG. 2 are generally described in relation to a passenger vehicle arrangement, as noted above the technology may be employed with other types of vehicles, such as the articulate bus 120 of FIGS. 1C-D. In this type of larger vehicle, the user interface elements such as displays, microphones and speakers may be distributed so that each passenger has his or her own information presentation unit and/or one or more common units that can present status information to larger groups of passengers.

Example Implementations

In view of the structures and configurations described above and illustrated in the figures, various aspects will now be described in accordance with aspects of the technology.

A self-driving vehicle, such as a vehicle with level 4 or level 5 autonomy that can perform driving actions without human operation, has unique requirements and capabilities. This includes making driving decisions based on a planned route, received traffic information, and objects in the external environment detected by the onboard sensors. However, in many instances the in-vehicle passengers and users awaiting pickup may desire status updates or other information from the vehicle about what the vehicle is currently doing. For instance, a user waiting for the vehicle to arrive may see a representation of the vehicle presented on a map. Here, if the vehicle is not moving along the roadway the user may wonder what is going on. This type of situation may be frustrating to the user because he or she does not understand what the vehicle is doing. Aspects of the technology can combine information from the perception system (e.g., detected objects including signage and lights), stored maps (e.g., roadgraph), and planned actions (e.g., from the planner module) to generate timely and relevant messages to the user via an app on the user's device. Such information may also or alternatively be presented to one or more passengers using displays and speakers that are disposed in the passenger compartment of the vehicle.

Example Scenarios

Figure 3:
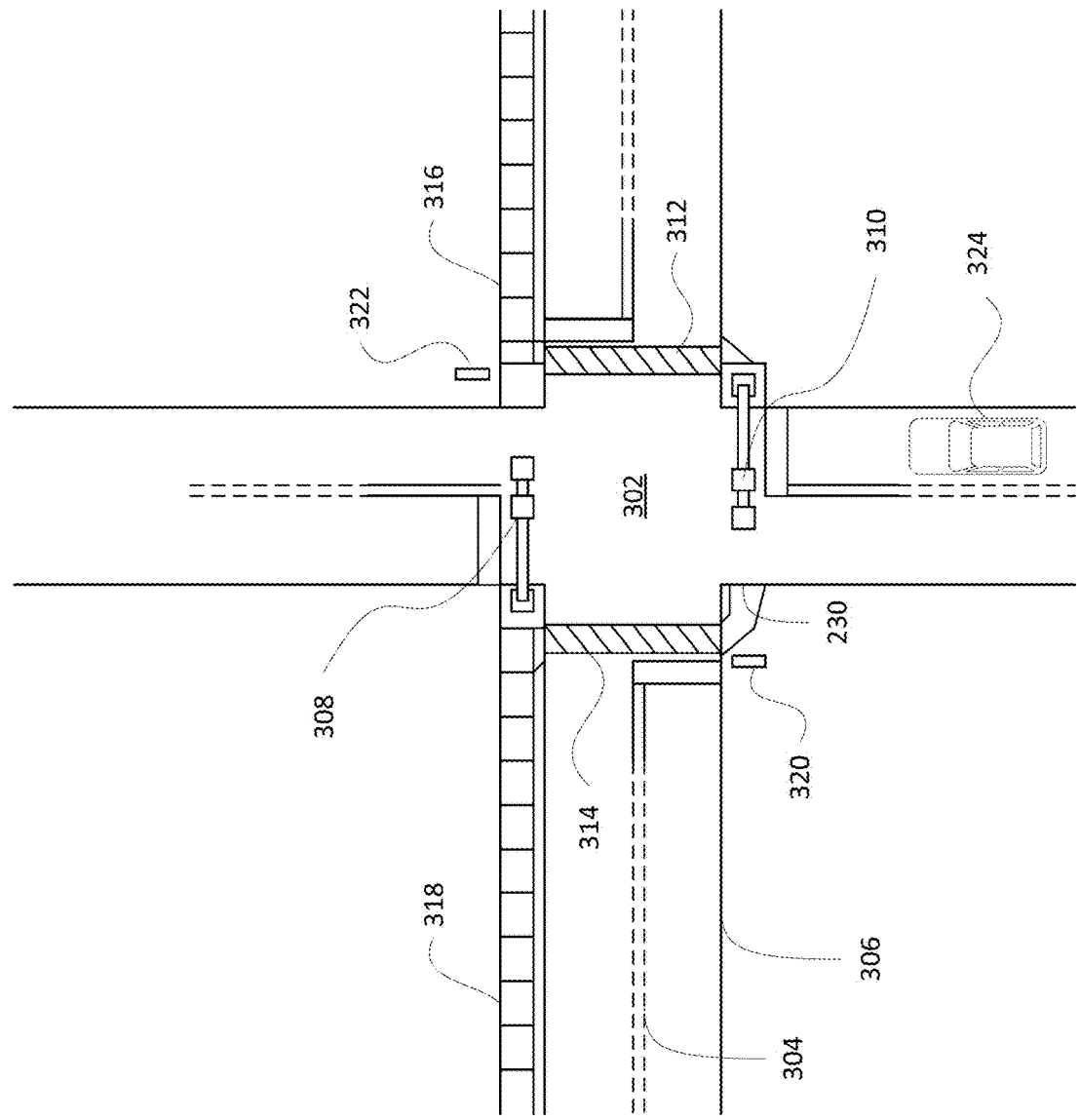
FIG. 3 illustrates an exemplary detailed map in accordance with aspects of the technology.

FIG. 3 is an example of detailed map information 300 for a section of roadway including intersection 302. In this example, the detailed map information 300 includes information identifying the shape, location, and other characteristics of lane lines 304, 306, traffic signal lights 308, 310, crosswalks 312, 314, sidewalks 316, 318, stop sign 320, and yield sign 322. Vehicle 324 may be configured to operate in an autonomous driving mode.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features. For example, a stop light or stop sign may be linked to a road and an intersection, etc. In some examples, the associated data may include grid-based indices of a roadgraph to allow for efficient lookup of certain roadgraph features.

While the detailed map information 300 may be used by the vehicle for planning and driving operations, it may not be necessary or feasible to provide all of the details to a passenger or other user. However, depending on the situation, certain information may be of particular relevance to the user.

By way of example only, FIGS. 4A-B illustrate situations 400 and 410, respectively, where the vehicle is stopped at an intersection. Here, the reason for the stoppage may be information helpful to the user. For instance, in the first view 400 the stoppage is due to a stop sign 402, whereas in the second view 410 the stoppage is due to a traffic light 412. Knowing that the vehicle is waiting for the traffic light to change color can indicate to the user that the vehicle will be moving shortly. In contrast, with a stop sign it may be harder to determine when the vehicle is able to proceed since that may be dependent on cross traffic. The vehicle may determine the type of signage from object recognition from the on-board perception system, from the detailed map information, and/or information received from a remote system (e.g., Google Maps or Waze).

Figure 4C:
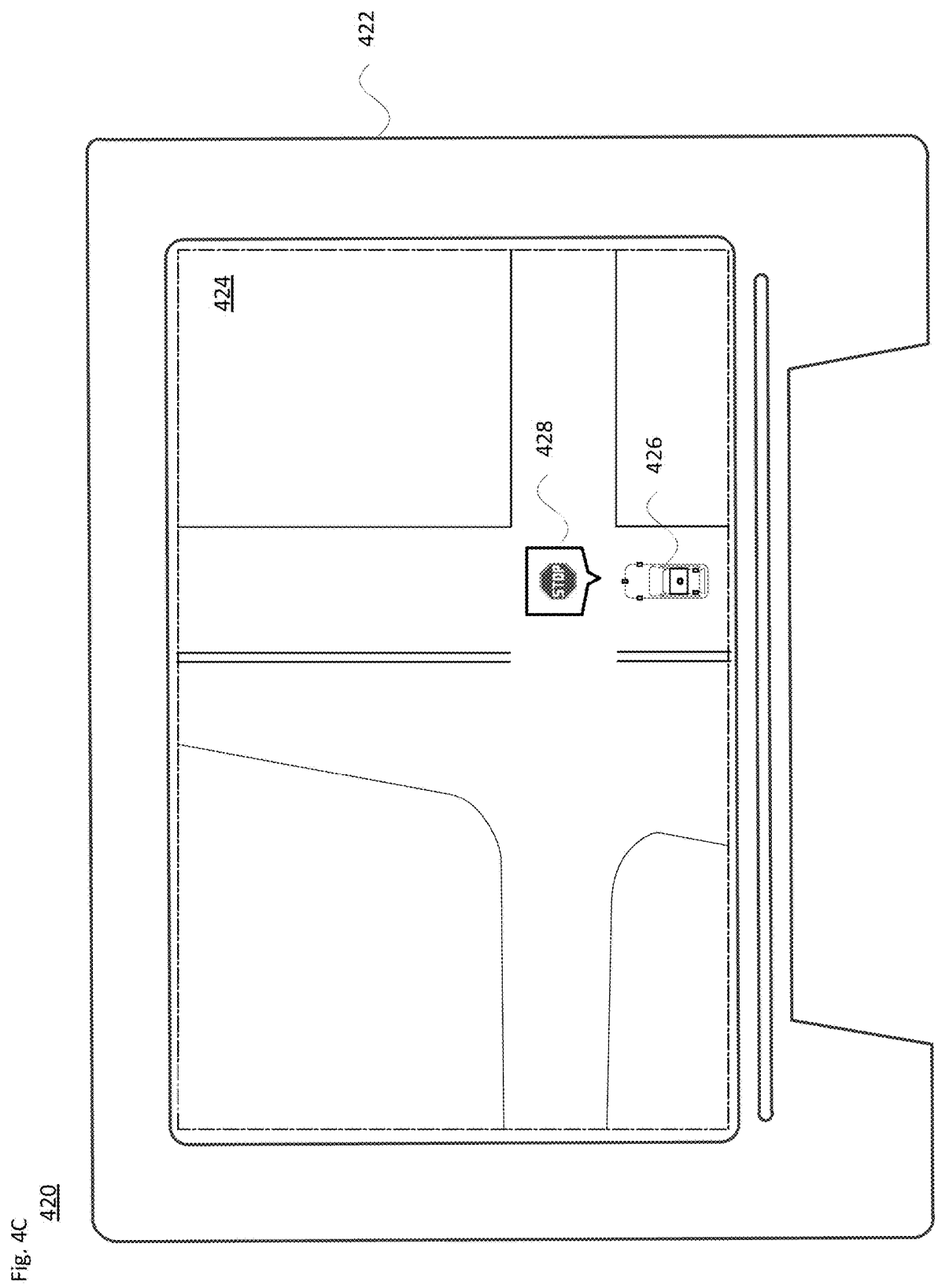
FIGS. 4C-D illustrate different in-vehicle map displays in accordance with aspects of the technology.
Figure 4D:
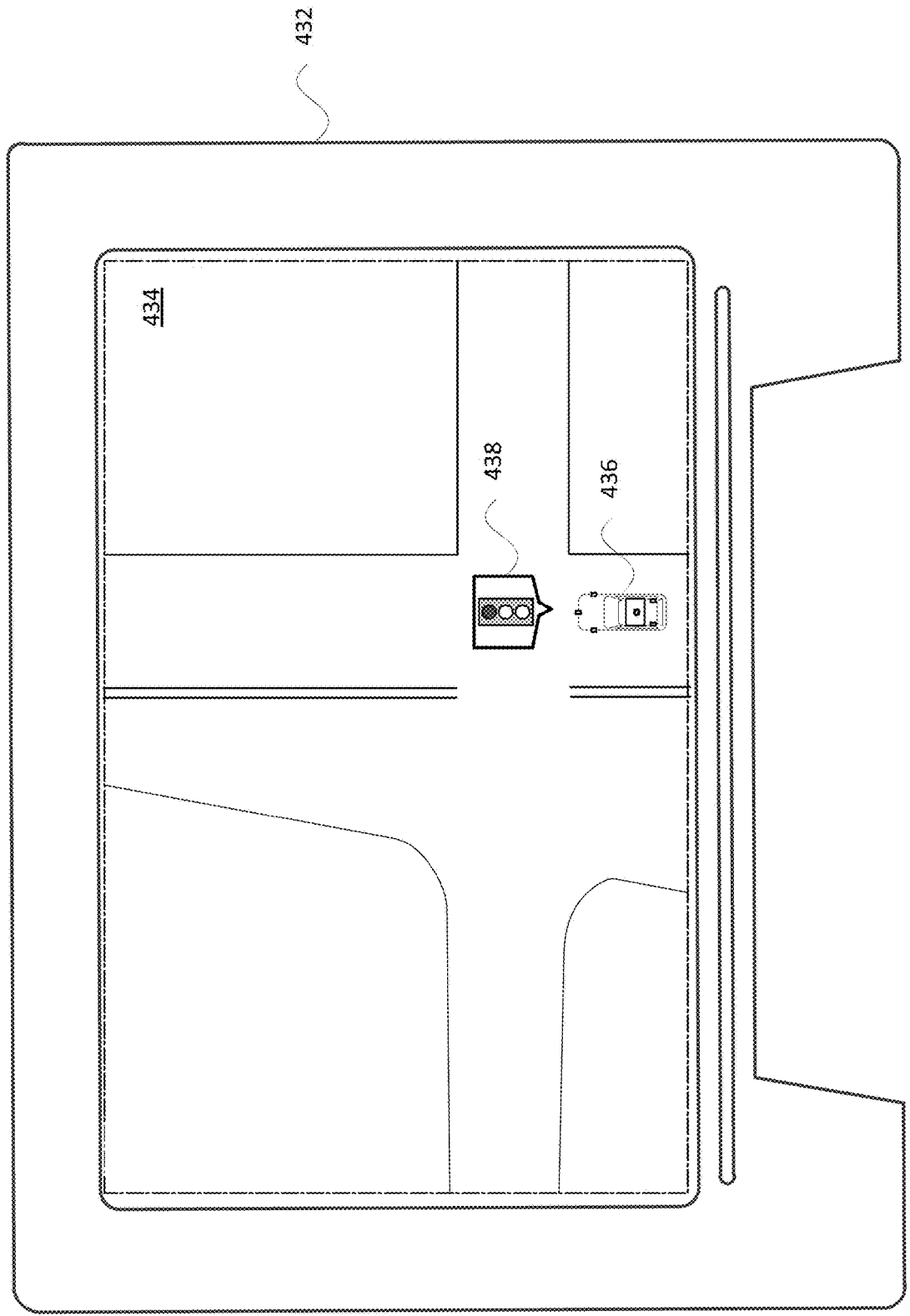

In the case of a traffic light, the perception system may be able to determine the color or other status of the light. This information may be communicated to in-vehicle passengers via a display mounted, e.g., along the rear-facing side of one or both of the front row seats or via a display on a console positioned, e.g., between or behind the front row seats. FIG. 4C illustrates one example 420 with an in-vehicle display 422 with map 424 presented thereon. The map 424 illustrates the vehicle 426, with a callout 428 specifically identifying the reason why the vehicle is not moving. Here, the callout 428 includes an icon therein showing a stop sign. Alternatively or additionally, text or other graphics may be presented in or adjacent to the callout to aid the rider in understanding the reason for the vehicle's current status (here, stopped at the intersection due to the stop sign). And FIG. 4D illustrates another example 430 with an in-vehicle display 432 with map 434 presented thereon. The map 434 illustrates the vehicle 436, with a callout 438 similar to callout 428. However, here the callout 438 includes an icon therein showing a stop light. As above, alternatively or additionally text or other graphics may be presented in or adjacent to the callout to aid the rider in understanding the reason for the vehicle's current status (here, stopped at the intersection due to the stop light).

Alternatively or additionally, the information may be transmitted to the user's personal device, such as a mobile phone, smart watch, tablet PC, etc. FIGS. 5A and 5B illustrate two examples 500 and 510 in which a user device such as a mobile phone 502 displays certain information to the user. As shown in FIG. 5A, the graphical interface (GUI) present a map 504 with the vehicle 506 and callout 508. As with the example of FIG. 4C, map 514 illustrates vehicle 516 with callout 518. In this example, callout 518 includes a stop light icon.

In one implementation, the information transmitted to the user's personal device originates from the vehicle. This information may be routed through a remote server, for instance as part of a fleet management system. In one scenario, the server would decide whether to message the user and how to message the user. In another scenario, the vehicle and the server both transmit status information to the user's device. This may be done in collaboration between the vehicle and the server, or independently. For instance, the vehicle may provide one set of information regarding what the vehicle sees in its environment and how it is responding to what it sees, while the server may provide another set of information, such as traffic status farther along the route or other contextual data. In these scenarios, the software (e.g., app) running on the user's device may be configured to select what information to show, and when to show it, based on the received data. One or both of the vehicle or the server may select different communication strategies based on the pickup status of the user (i.e., awaiting pickup or picked up and in the vehicle). Alternatively or additionally, or the app or other program on the user's device may select different communication strategies. This may be based on the pickup status, the type(s) of information received, etc.

In addition to indicating the type of signage, the vehicle may also communicate a message about its status. As seen in FIGS. 5A and 5B, respective regions 509 and 519 are arranged to provide contextual details to the user. For a passenger awaiting pickup, this may include the time (or distance) to pickup, information to identify the vehicle, information about the ride requested by the user (e.g., pickup and drop-off locations, stops along the route, user preferences, etc.) as well as information about the user's account and/or support, for instance from a remote assistance service associated with the vehicle.

These and other graphical interfaces may be provided on an app or other program operating on the user's personal device. Depending on the type of device and the location (e.g., external to the vehicle or within the vehicle), the vehicle's onboard computer system (control system) may select which information to present on the user's device and how to present it. Similarly, when the user is in the vehicle, the onboard system may select what information to present, and how to present it, on the vehicle's display device(s).

Figure 6A:
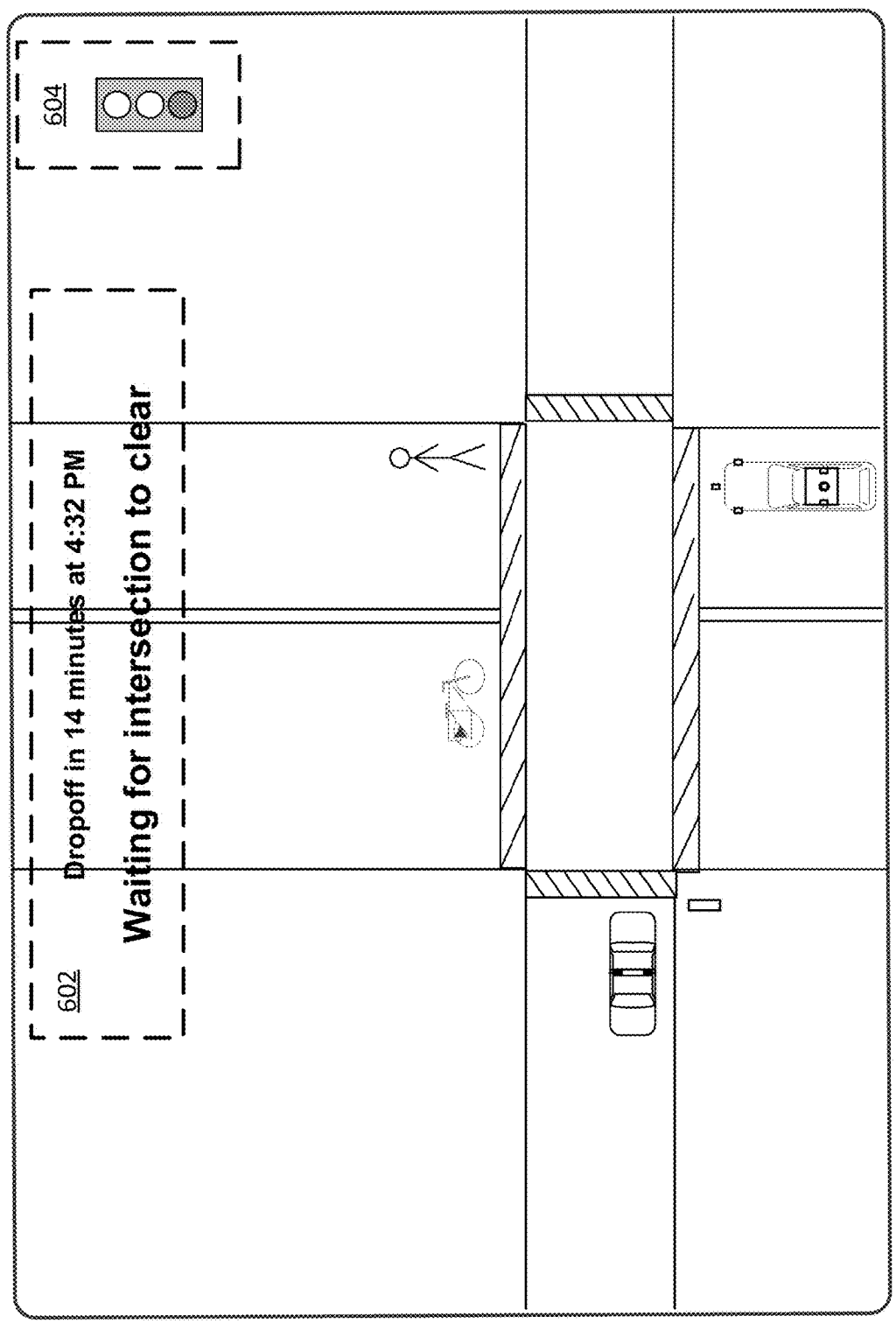
FIGS. 6A-D illustrate examples of different message presentations in accordance with aspects of the technology.
Figure 6B:
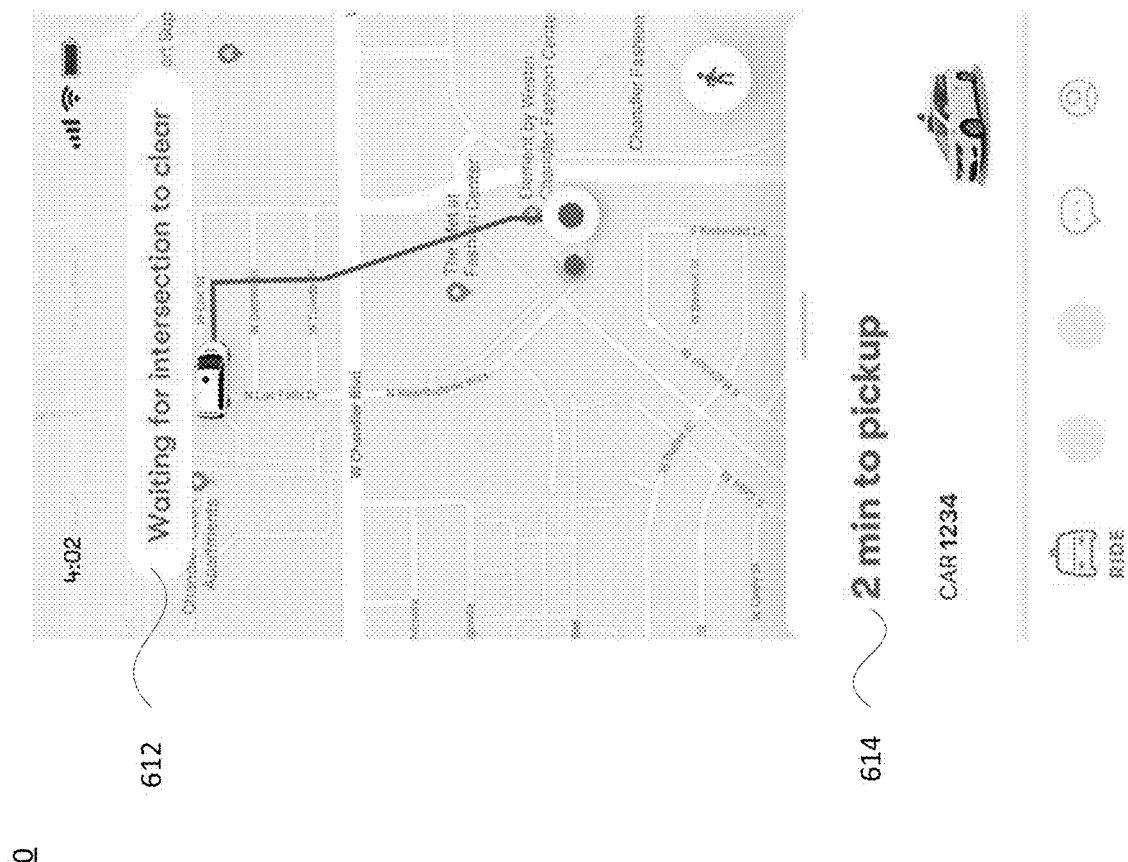
Figure 6D:
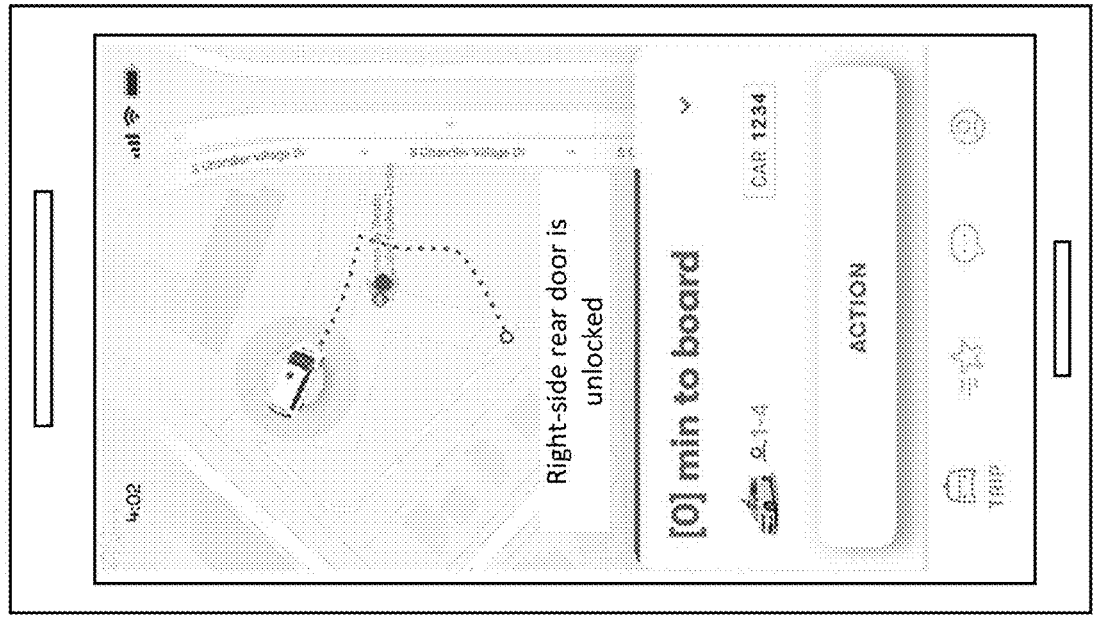

For instance, as shown in the examples of FIGS. 6A-B, the message to the user (on the in-vehicle display 600 of FIG. 6A and the app 610 on the user's device in FIG. 6B) is "Waiting for intersection to clear". In the example of FIG. 6A, the message may be presented in a selected region 602 of the display as illustrated by the dashed box. The reason why the vehicle is waiting may be illustrated in this or another region, e.g., region 604 (which shows a traffic light icon), also illustrated by a dashed box. In this example, even though the light may be green, there may be pedestrians, bicyclists or other objects in the intersection. In contrast, while the message in FIG. 6B is also presented in a selected region 612 of the GUI by the app, in this case the reason (e.g., a traffic light or stop sign) may be omitted. Here, the vehicle's onboard system may select different information to present to the user to be picked up that is more relevant. For instance, as shown the app may inform the user in region 614 that he or she will be picked up in two minutes. By way of example, the onboard system may evaluate the time and/or distance until pickup when selecting whether to present icons, text, audible information or other data to the user, and choose certain data based on a ranked list of predicted importance to the recipient. Thus, in this case the system may rank (i) a message with the time until pickup, (ii) an icon indicating a present action or condition of the vehicle (e.g., waiting at a stop light, stop sign, yield sign, etc.), (iii) pickup location information, and the like, and select a subset of the ranked information for transmission to the user's device for presentation to the user.

The information which may be ranked by the onboard system may be obtained from a variety of sources including the vehicle's perception system, the vehicle's route planner, a machine-learning based detection module, a remote assistance service, etc. By way of example, the control system may include a module that receives (listens to) a variety of inputs and then distills the inputs into a user-focused communication. For instance, one set of inputs may be produced by the perception system, such as detection of traffic lights, signage, etc. Another set of inputs may be produced by a navigation or mapping system in response to prestored or detected information. This can include extracting information encoded in an electronic map (e.g., whether an upcoming road segment is a permanent slow zone such as a school zone, or something that is dynamically detected by the perception system such as a construction zone). And another set of inputs may include navigation decisions or other route planning actions. Here, for instance, a machine learning model may detect when the vehicle is unable to immediately move (e.g., due to gridlock).

The various inputs from different onboard systems thus generate messages in real time about various conditions and situations. This information may be passed across a user interface bridge (or bus). The system listens for the information and distills it for presentation to one or more users via user devices and/or onboard UI components. According to one aspect, a user experience (UX) framework is generated for what kind of data is to be passed to the app on a user device, what is presented by the vehicle directly, and what is transmitted to both the device app and the vehicle's UI system.

The framework may incorporate whether the information is directly or contextually relevant to autonomous driving decisions. For example, the onboard system may detect a red light and, as a result, the vehicle makes a driving-related decision to stop at the red light. In such cases having a high confidence of accuracy (e.g., that the traffic signal is red) and relevance (e.g., that a red light will result in a delay before the vehicle can proceed through the intersection), the default of the framework may be to always present information to the user regarding the driving decision. So here, the user will receive an indication that the vehicle is stopping at a red light. In contrast, contextually relevant information may not explicitly be related to a current driving decision but can have an impact on the user. Gridlock is one example. Here, there are one or more other vehicles in front of the vehicle. This may not change any driving decisions, but the gridlock will likely affect arrival time at a destination. Thus, in this case, the system may elect to present contextual information (e.g., informing the passengers that the vehicle is entering a slow zone, is currently gridlocked, etc.). This contextual information may be very important to the user so the user can gauge the trustworthiness of the arrival time.

Rankings or thresholds may be employed by the framework when choosing how to disseminate the information. For instance, in one scenario a ranking order example would be, from highest to lowest, (1) features that make the vehicle stop (e.g., red light, train on a railroad crossing, etc.), (2) features that the vehicle predicts will cause a long pause in driving (e.g., a stop sign or a yield sign at a busy intersection, unprotected left turn, etc.), (3) features that can cause the vehicle to move very slowly (e.g., a construction zone, traffic, etc.) such as at lower than a posted speed, and (4) features that may make the vehicle deviate from a normal course of action (e.g., an emergency vehicle causing the vehicle to pull over or excessive traffic or unplanned obstacles causing the vehicle to take an alternative route). Time may often be a threshold considered by the framework. For instance, micro-hesitations (e.g., on the order of 1-10 seconds) may be less perceptible to a user, but a slightly longer delay (e.g., on the order of 30-45 seconds) may be more apparent. Thus, in the latter case the vehicle may inform the user about the reason for the delay, but in the former case the reason for the delay may be omitted.

The timing may be factored in for relevance to the user and for the ranking order. By way of example, the framework may include restrictions on messaging hierarchy and timing. For instance, messages that are classified as "priority" messages may supersede one or more lower priority messages. In one scenario, the ranking system may be on a scale of 1-4, with 1 being the highest priority.

The framework may also select whether additional descriptive information may be presented, such as including a section at the top (or bottom) of the app that gives more context about the current scenario/state of operation. By way of example, an "Approaching a red light" text string might be displayed in addition to a callout bubble on the map with a red light icon. In contrast, for other signals such as a green light, the callout bubble may be presented without a further textual description to avoid cluttering the interface. Alternatively or additionally, the visual display may include changing the route color in the case of "slow zones".

Thus, according to aspects of the technology, the vehicle reports (via the monologue it generates) its current status to the user based on the vehicle's knowledge about what is going on in the immediate environment. There are several aspects to this functionality. In particular, interaction with the environment/external world as detected by the vehicle, impact of this interaction on the user, and communication of the information to the user (either directly from the vehicle's displays or via an app on the user's device or both). Non-visual information may also be presented to the user in addition or alternatively to displaying it. By way of example, the monologue messages may be verbally spoken aloud to the user. Such voice-based messages may be available on demand, such as when the user asks what the car is doing. The same messaging architecture described above for visual display also applied to audible monologue information.

There are numerous scenarios where providing the vehicle's monologue to the user can be beneficial. As discussed above, one main type of scenario is the vehicle reporting its current driving status or why it is waiting to take an action. Selected examples can include the following. The vehicle may identify its present location, such as "I am located next to the tall tree adjacent to the green car. The location information can be presented from the perspective of what the user is expected or predicted to see (e.g., based on location information from the user's device) and/or from the perspective of what the vehicle detects from its sensors such as a camera. Another example is a "move along" situation, e.g., where the vehicle needs to drive around the block. Here, the information presented may include a possible pickup location once the vehicle loops around, a timer indicated an expected arrival time, landmark information to aid the user to find where the vehicle will be, etc.

Figure 6C:
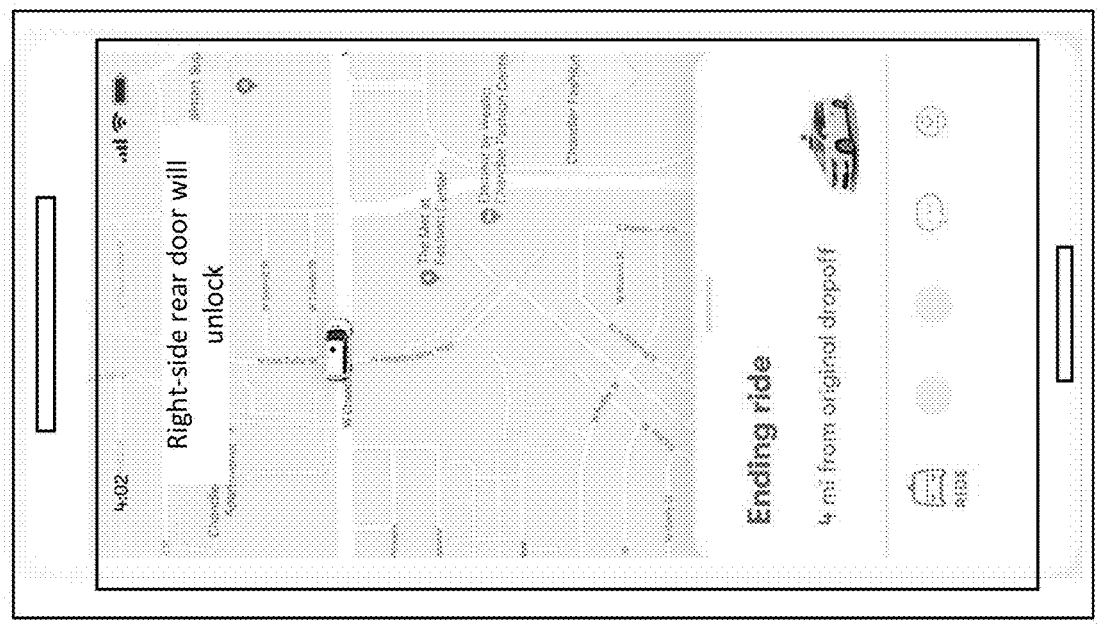

Other driving-related information includes communicating what the vehicle is doing and perceiving, such as yielding to pedestrian, yielding to cyclist, driving slowly through a work zone or school zone, idling at a railroad crossing waiting for a train to pass, yielding for emergency vehicles, etc. In one example, vehicle identification information (e.g., text, icons or other graphics) may be display externally on or by the vehicle, and such information can also be presented via the monologue as well. In another example, the vehicle may indicate carpooling status, such as whether other riders have been picked up, the next rider to be picked up, where riders are sitting or which seats are available, an estimated time when all of the riders will have been picked up or dropped off, etc. Whether the user is inside the vehicle or about to enter the vehicle, the monologue may indicate the door lock/unlock status. This information may be presented, for instance, when the vehicle is waiting at the pickup location or upon arrival at a drop-off location. For instance, FIG. 6C illustrates an example 620 of monologue information presented on the user's device when the ride is ending. Here, the information indicates that the right side rear door will unlock when the vehicle comes to a stop. And in example 630 of FIG. 6C, the monologue indicates to the rider that the right side rear door is unlocked.

Information about certain vehicle systems and components may be presented via the monologue. For instance, this can include informing passengers about the window status, such as which windows may be rolled down or which are locked. The app may also allow the user to control operation for opening and closing the windows. Similarly, the windshield wiper status or cabin temperature may be presented to or controlled by the passenger. Here, while the vehicle may not need to activate the wipers, the user may want to have a better view of what is happening around the vehicle, and so may turn the wipers on or control the wiper speed. Similarly, the user may be able to control heating or air conditioning within the cabin, turn the defrosters on or off, etc. In one scenario, information about whether the wipers are on could be an indicator of light rain. In another scenario, precipitation may be detected by one or more of the vehicle sensors. So in this case the monologue may inform the user to stay inside until the vehicle arrives, or to have an umbrella ready before exiting the vehicle. External (ambient) temperature information may also be communicated, for instance to suggest that the user bundle up before exiting the vehicle.

Yet another example involves two-way communication for pickup and/or drop off. For instance, the app on the user's device may permit the user to speak with the vehicle in order to indicate where he or she is located to expedite pickup, or to identify a landmark at which to be dropped off. Thus, the user may take actions such as messaging the vehicle by saying "I'll be there in 1 minute" or "I need another minute or two". The user may also take another action such as sharing his or her exact location, or ask the vehicle to find a spot closer to user's current location or that avoids an undesirable spot such as in front of a puddle or ice patch.

A further example of a type of monologue information for presentation to a user is delivery status of a package. For instance, details about package pickup or delivery, whether the vehicle is in route, where the vehicle/package is currently located may all be presented to the user. This can give the user enhanced confidence that his or her package is being treated carefully and that it will arrive at the intended destination at a particular time.

In addition to these examples, the vehicle may also communicate other information such as the route generated by the on-board planner module, whether the vehicle missed a turn and needs to adjust the route, etc. In one example, the app may enable the user to tap the screen or otherwise query (e.g., via an audible question or hand gesture) the onboard system for more details about the vehicle's status or related information.

As discussed above, many different messages can be presented to the user, whether he or she is current in the vehicle or awaiting pickup. This information may include some or all of the following messages. Additional contextual information may be included as shown in the brackets:

Current street name
Waiting for intersection to clear
Finding a better spot to pull over
Pulling over
Pulling over for [a moment] [_____ minutes]
Entering [school/construction/slow/work] zone
Yielding to emergency vehicle [vehicle type, e.g., police car, fire truck, ambulance]
Slowing down for [object] [location]
Avoiding [object] [traffic] [delay]
Stopped for railroad crossing
Figuring this out
Turning hazard lights on [due to weather condition] [due to road condition]
Unlocking door(s) [for a driver/for a passenger]

The information presented via the monologue can be highlighted for the user in different ways for emphasis. By way of example, a highlighted or glowing background in the app can be used to signal that the message is from the vehicle. The message may flash two or more times, different graphics may be presented in a pattern, etc.

In a stop sign example (see, e.g., FIG. 4C or 5A), a line or pulse may trace along the planned route towards the stop sign. This may happen as the vehicle is within a threshold distance of the stop sign (e.g., within 50-200 meters, 1-2 blocks, or line of sight). Alternatively or additionally, a callout may emerge from the route on the displayed map to highlight the stop sign. An audible cue or more detailed textual information may be presented alternatively or additionally with the visual information of the callout. For example, text along an upper or lower portion of the app or audio may be presented in addition to the callout, which says something such as "Approaching a stop sign".

In a stop light example, the information presented may depend on the light's status. For instance, if the light is green, merely displaying a representation of the green light may suffice. However, if the light is red or flashing, an icon, text or other graphical representation may be accompanied by an audible notification. The information about the stop light may be presented when the vehicle is within a threshold distance in the same way as the stop sign example discussed above. The stop light graphics may remain on the display until the vehicle reaches or passes that location. Similar approaches may be used for other signage (e.g., yield signs), railroad crossings, etc. As noted above, depending on the type of light or other signage, the framework may select additional contextual information (e.g., for a red light) or not (e.g., for a green light).

For slow zones (e.g., school zones, constructions zones, etc.), the monologue may highlight the portion of the route that is within the zone. A callout or other graphic can extend from or be presented adjacent to the center of the zone. Here, the callout may move as the vehicle moves, for instance to remain in the center of the zone until the displayed zone shrinks below some threshold level (e.g., the zone on the UI is smaller than the illustrated vehicle). The user may tap on or otherwise select the graphic and receive more detailed information from the vehicle about the situation. And when the vehicle is determining what driving decision to make (e.g., "Figuring this out"), graphical and/or audible information may be presented to the user to indicate the status.

In other situations, the vehicle may require some amount of time to determine what the next driving action will be. In this type of "Figuring this out" situation, the app or the in-vehicle display may provide some indication that the vehicle is "temporarily thinking". Here, icons, text and/or audio information may indicate to the user that the vehicle is working on a solution. In one example, for "thinking" or paused routes (e.g., waiting for a gridlocked intersection to clear), the route color may change to communicate temporary inactivity.

It can be seen that the vehicle's generated monologue may present information graphically, for instance using easily discernible icons and/or textual components to effectively communicate the monologue information to the user. The vehicle may determine how to present this information to the user, and this can differ depending on whether the information is presented on a display within the vehicle or via an app on the user's device. By way of example, when presenting information via the app when the user is not in the vehicle, the system may estimate or otherwise account for any delays in transmitting the data to the app. Here, the timing of status updates or specificity in the information presented may be changed in response to expected or detected delays in sending the app the information (e.g., information about vehicle speed, stoplight status, perception information about objects in the vehicle's environment, etc.).

There may also be differences in how the information is sent to the app when the user's device is inside the vehicle and the updates can be provided via an ad hoc communication link (e.g., Bluetooth™, Bluetooth LE™, NFC) as opposed to via a cellular communication link. Finally, when the user is within the vehicle, the on-board system could potentially change the monologue appearance on the vehicle's display(s) depending on type of device, placement of the display, where the user is sitting, and/or whether user is looking at the screen. For instance, if the user is sitting in the front passenger (or driver) seat, the system may elect to present more detailed information to the user about the vehicle's current status than if the user is seated behind the front row.

An example of something easier to see via the back screens (e.g., displays positioned on the backs of the front seats or in a console between the front seats) than from the front seat is a tailgater, especially if there is no display screen along the dashboard. For instance, in the front seat if there is no display along the dashboard area, the passenger would need to be looking in the rear view mirror to detect another vehicle close behind. In contrast, information can be presented on the back screen(s) showing not only the relative position of the tailgater, but also provide information about any action the autonomous vehicle may take (or not take) in response to the other vehicle. In one scenario, with riders seated in the rear row, the monologue may not need to be displayed in the device app during a ride. However, with a rider seated in the front row, showing the monologue would be one of the ways the vehicle may explain its behavior. There are several ways to detect where riders sit (e.g., an interior camera, seat occupancy sensor, seatbelt sensor, door open indicator, etc.). Other forms of augmenting the content may be user initiated features where tapping the app screen (or in-vehicle screen) would trigger for the monologue to be audibly announced. There may also be specific vehicle-initiated actions, e.g., if a rider has placed items in the back row or in the trunk, the vehicle may announce "Unlocked trunk" or "Opening rear door".

As noted above, information may be presented to the user differently depending on whether he or she is viewing the information on their device's app or via a cabin display. By way of example, in some situations the app may be used for mostly or solely one-way information provided by the vehicle, whereas the in-cabin UI may provide interactive capabilities for the user. Here, a monologue notification may be presented on the screen of the user's device. The user could request that certain information be presented or replayed on an in-cabin display, such as the last 5-10 seconds of driving actions. In contrast, there may be situations where the app itself triggers a change in information presented by the monologue. For instance, if the person uses the app to remotely unlock the vehicle's doors, the monologue may present information confirming or alerting the person to the change in status. Another example may be as an "interplay" between the in-vehicle display and the app. For instance, certain monologues may be focused on explaining the vehicle's current behavior, but some may be less clear than others (e.g., "Figuring this out"). When these types of monologues might appear on the in-vehicle rider screen (or the app), the user may be able to tap to explore or "tag" the content to be viewed later. In this case, the collected tags could then be relayed in follow up communications in the form of educational content to learn more about what the vehicle was doing or how the vehicle determines what to do.

As discussed further below, monologue information may be communicated to a user device by routing data via a cellular or other wireless link. A remote service may help coordinate certain information communicated to the user from the vehicle, or may provide different information to the user and/or the vehicle. For instance, map, traffic and weather updates may be provided to the vehicle from the remote service. This information may affect the planned route, which may in turn change the status message(s) sent from the vehicle to the user.

By way of example, there may be status updates or a request for action from a delivery or third party service. For instance, if there is curbside pickup of a package, the status for when something might be ready for curbside delivery may be pushed (transmitted) to the in-car display or the app. Schedule changes (e.g., if the trip is changed) may also impact routing. Thus, if a scheduled meeting on the user's calendar is canceled, this may affect a scheduled trip. This could include evaluating a single service or a combination of services, e.g., the user's calendar and a flight status.

The monologue may be part of a multi-layer UI stack for different types of notifications. Other notification layers may provide information with various levels of importance/urgency. In one scenario, monologue information may be presented via a single line of text, a bubble or other callout adjacent to the vehicle (such as shown in FIGS. 4C-D), or other graphics. The information may be displayed (and/or repeated audibly) for as long as the event or condition is true. Thus, the message "Yielding to cyclist" may be displayed along a portion of the UI until the cyclist has moved away from the vehicle or otherwise clears from the vehicle's planned path. As such, information from the on-board planner and perception systems may be continuously evaluated to determine the type of notification to provide and when to stop providing it.

The information, and how it is presented, may depend on what stage the transportation status is at. For instance, the vehicle may be on the way to a pickup, in which case the monologue information must be presented to the user via his or her device. If the vehicle is in the process of transporting the user to his or her destination, the information may be presented on their device and/or the in-vehicle UI system.

Figure 7A:
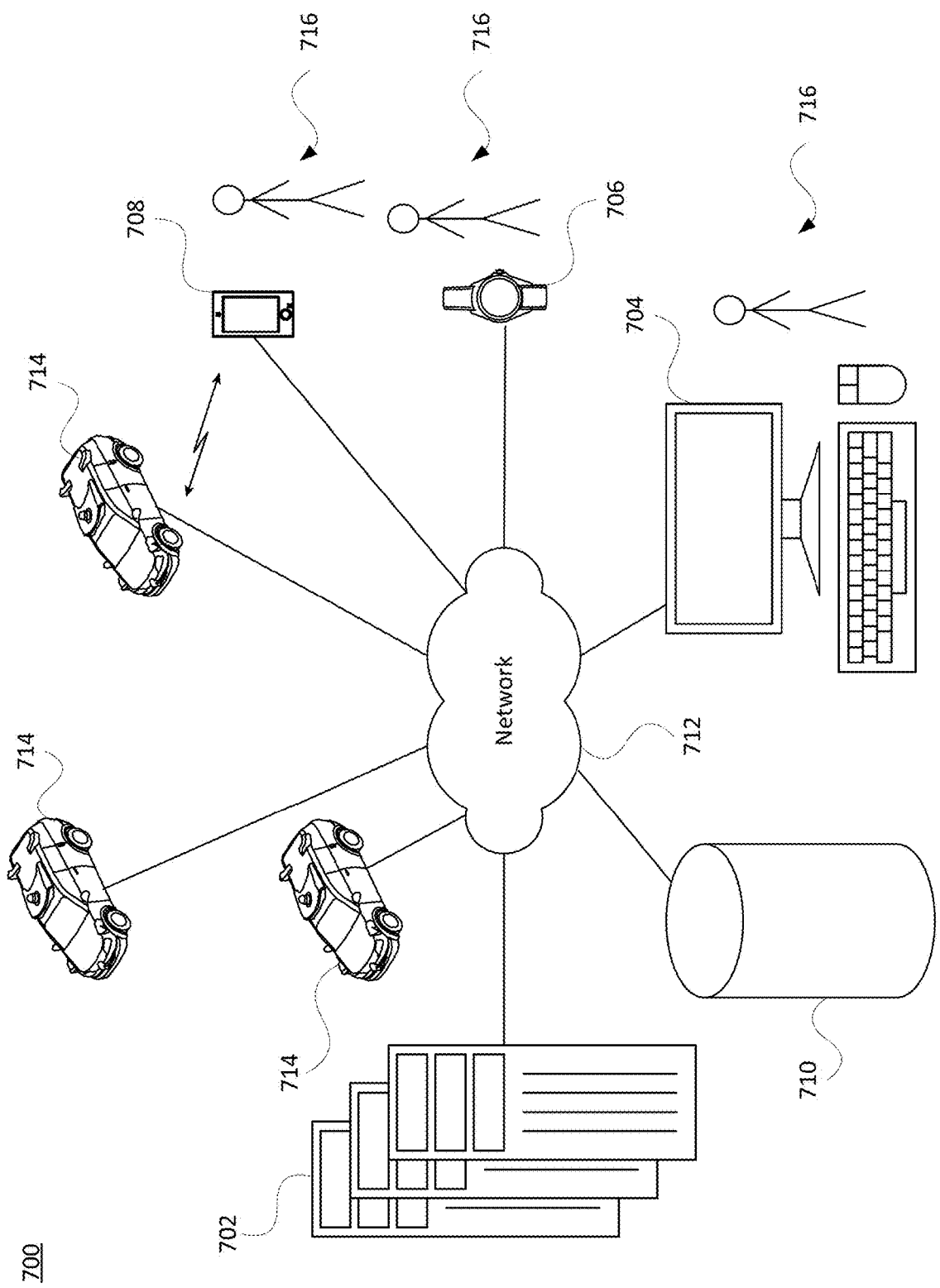
FIGS. 7A-B illustrates an example system in accordance with aspects of the technology.
Figure 7B:
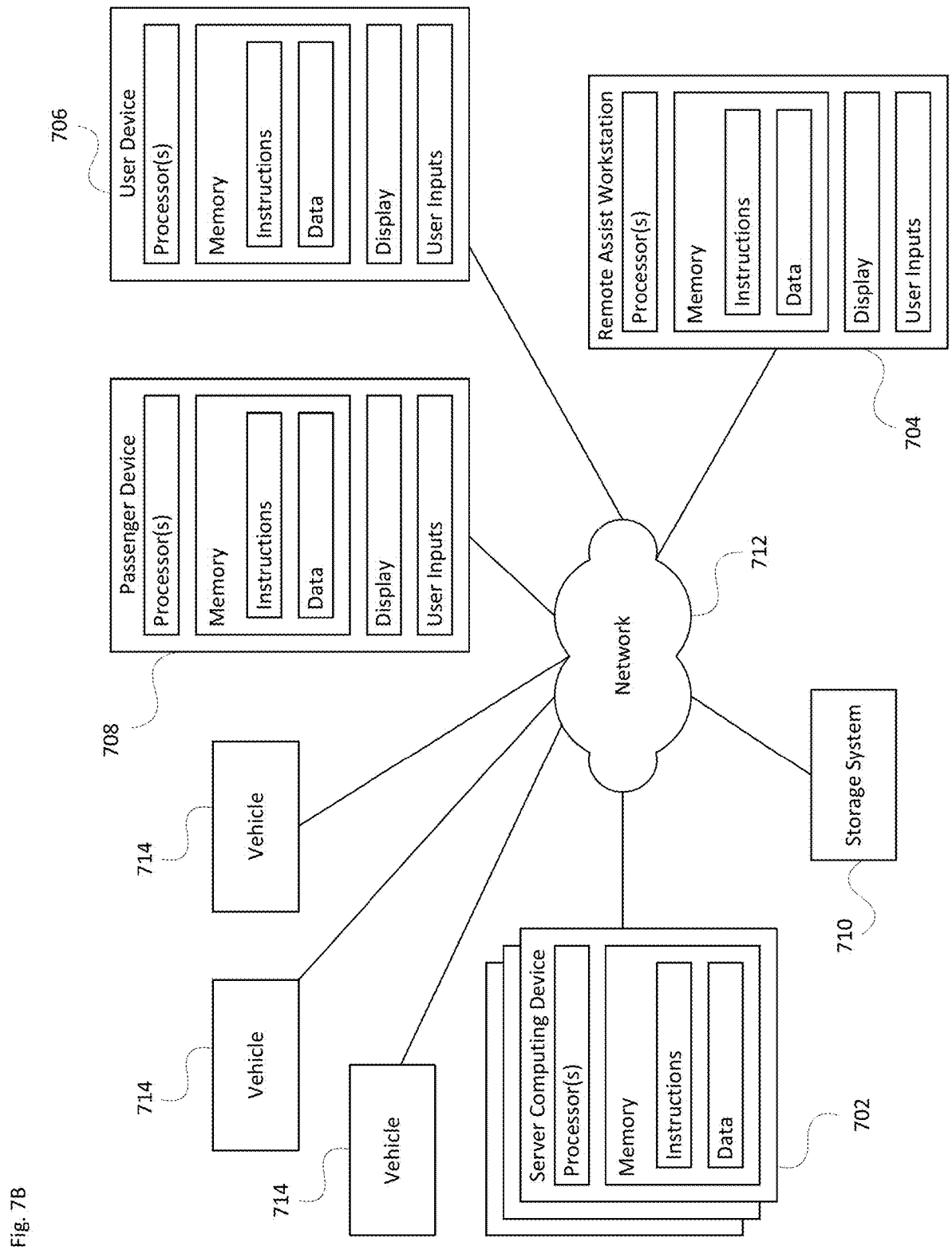

FIGS. 7A-B illustrate general examples of how information may be communicated between the vehicle and the user.

In particular, FIGS. 7A and 7B are pictorial and functional diagrams, respectively, of an example system 700 that includes a plurality of computing devices 702, 704, 706, 708 and a storage system 710 connected via a network 712. System 700 also includes vehicles 914, which may be configured the same as or similarly to vehicles 100 and 120 of FIGS. 1A-B and 1C-D, respectively. Vehicles 714 may be part of a fleet of vehicles. Although only a few vehicles and computing devices are depicted for simplicity, a typical system may include significantly more.

As shown in FIG. 7B, each of computing devices 702, 704, 706 and 708 may include one or more processors, memory, data and instructions. Such processors, memories, data and instructions may be configured similarly to the ones described above with regard to FIG. 2. The various computing devices and vehicles may communication via one or more networks, such as network 712. The network 712, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 702 may include one or more server computing devices having a plurality of computing devices, e.g., a load balanced server farm, that exchange information with different nodes of a network for the purpose of receiving, processing and transmitting the data to and from other computing devices. For instance, computing device 702 may include one or more server computing devices that are capable of communicating with the computing devices of vehicles 714, as well as computing devices 704, 706 and 708 via the network 712. For example, vehicles 714 may be a part of a fleet of vehicles that can be dispatched by a server computing device to various locations. In this regard, the computing device 702 may function as a dispatching server computing system which can be used to dispatch vehicles to different locations in order to pick up and drop off passengers or to pick up and deliver cargo. In addition, server computing device 702 may use network 712 to transmit and present information to a user of one of the other computing devices or a passenger of a vehicle. In this regard, computing devices 704, 706 and 708 may be considered client computing devices.

As shown in FIG. 7A each client computing device 704, 706 and 708 may be a personal computing device intended for use by a respective user 716, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another. As indicated in FIG. 7B, device 708 may be the device of a passenger who is currently in the vehicle, while device 706 may be the device of a user awaiting pickup.

Although the client computing devices may each comprise a full-sized personal computing device, they may alternatively comprise mobile computing devices capable of wirelessly exchanging data with a server over a network such as the Internet. By way of example only, client computing devices 706 and 708 may be mobile phones or devices such as a wireless-enabled PDA, a tablet PC, a wearable computing device (e.g., a smartwatch), or a netbook that is capable of obtaining information via the Internet or other networks.

In some examples, client computing device 704 may be a remote assistance workstation used by an administrator or operator to communicate with passengers of dispatched vehicles, or users awaiting pickup. Although only a single remote assistance workstation 704 is shown in FIGS. 7A-7B, any number of such workstations may be included in a given system. Moreover, although workstation 704 is depicted as a desktop-type computer, the workstation 704 may include various types of personal computing devices such as laptops, netbooks, tablet computers, etc.

Storage system 710 can be of any type of computerized storage capable of storing information accessible by the server computing devices 702, such as a hard-drive, memory card, ROM, RAM, DVD, CD-ROM, flash drive and/or tape drive. In addition, storage system 710 may include a distributed storage system where data is stored on a plurality of different storage devices which may be physically located at the same or different geographic locations. Storage system 710 may be connected to the computing devices via the network 712 as shown in FIGS. 7A-B, and/or may be directly connected to or incorporated into any of the computing devices.

In a situation where there are passengers, the vehicle or remote assistance may communicate directly or indirectly with the passengers' client computing device. Here, for example, information may be provided to the passengers regarding current driving operations, changes to the route in response to the situation, etc. As explained above, information may be passed from the vehicle to the passenger or other user via the vehicle's monologue UI. For instance, when the user is awaiting pickup, the vehicle may send monologue information via network 712. However, when the vehicle arrives at the pickup location or the user enters the vehicle, the vehicle may communicate directly with the user's device, e.g., via a Bluetooth™ or NFC communication link. Communication delays (e.g., due to network congestion, bandwidth limitations, coverage dead zones, etc.) may be factored in by the vehicle when deciding what specific information is provided by the monologue.

FIG. 8 illustrates a method of operation in accordance with the foregoing. At block 802, the method includes determining, by one or more processors of a vehicle operating in an autonomous driving mode, status information associated with the vehicle. At block 804, a pickup status of a customer is determined by the processors. The pickup status indicates whether the customer is awaiting pickup by the vehicle or is currently being driven by the vehicle in the autonomous driving mode. At block 806, the one or more processors select one of a plurality of communication options for communication with the customer based on the pickup status. At block 808, the processor(s) generates, in accordance with the selected communication option, a monologue message indicating status information associated with the vehicle. And at block 810 the monologue message is provided for presentation to the customer.

FIG. 9 illustrates another method of operation in accordance with the foregoing. At block 902 the method includes determining, by one or more processors, status information associated with a vehicle operating in an autonomous driving mode. At block 904, the one or more processors, determine a pickup status of a customer. The pickup status indicates whether the customer is awaiting pickup by the vehicle or is currently being driven by the vehicle in the autonomous driving mode. At block 906, the one or more processors select, based on the pickup status, one of a plurality of communication options for communication with the customer via a personal communication device of the customer. At block 908, the one or more processors generate, in accordance with the selected communication option, a monologue message indicating status information associated with the vehicle. And a block 910, the monologue message is provided for presentation to the customer via the personal communication device.

In one example, a first one of the one or more processors may be a processing device of the vehicle or processing device of a remote server in operative communication with the vehicle. In another example, a first one of the one or more processors may be a processing device of the vehicle while a second one of the one or more processors is a processing device of the vehicle. In this case, the method includes the first processor generating a first set of information for the monologue message the second processor generating a second set of information for the monologue message. And in a further alternative, a first one of the one or more processors is a processing device of the personal communication device. Here, the method includes the processing device selecting information received from at least one of the vehicle or a remote server for presentation in the monologue message.

Finally, as noted above, the technology is applicable for various types of vehicles, including passenger cars, buses, RVs and trucks or other cargo carrying vehicles.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements. The processes or other operations may be performed in a different order or simultaneously, unless expressly indicated otherwise herein.

The invention claimed is:

1. A method, comprising:
    obtaining, by one or more processors of a computing system, vehicle status information about a vehicle operating in an autonomous driving mode, the vehicle status information comprising information about a current trip associated with a passenger;
    obtaining, by the one or more processors, information about a traffic signal or a traffic sign that the vehicle is approaching in the autonomous driving mode;
    determining, by the one or more processors, whether the traffic signal or the traffic sign will delay a pickup time for the passenger at a selected location by at least a threshold amount;
    and
    upon determining that the traffic signal or the traffic sign will delay the pickup time by the at least the threshold amount, causing, by the one or more processors, a visual representation of the traffic signal or the traffic sign to be displayed concurrently with a map and an indication of a reason for the delay in a graphical user interface of a computing device of the passenger.

2. The method of claim 1, wherein the information about the current trip includes at least one of a time until the vehicle will arrive at the selected location, a distance between the vehicle and the selected location, information to identify the vehicle, or information about a stop along a route.

3. The method of claim 1, wherein the passenger is awaiting pickup by the vehicle.

4. The method of claim 1, wherein the indication of the reason for the delay includes textual information that explains the information about the traffic signal or the traffic sign.

5. The method of claim 4, wherein causing at least one of the visual representation or the textual information to be displayed in the graphical user interface stops after the vehicle reaches or passes the traffic signal or the traffic sign.

6. The method of claim 4, wherein the textual information identifies a color of the traffic signal or a type of the traffic sign.

7. The method of claim 1, wherein the visual representation includes a color of the traffic signal or a visualization of the traffic sign.

8. The method of claim 1, wherein causing the visual representation to be displayed in the graphical user interface includes determining when to display the visual representation according to a distance between the vehicle and the traffic signal or the traffic sign.

9. The method of claim 1, wherein obtaining the information about the traffic signal or the traffic sign includes receiving the information from the vehicle during operation in the autonomous driving mode.

10. The method of claim 1, wherein the information about the current trip includes a message from the vehicle communicating its current status.

11. The method of claim 1, wherein:
    the information about the traffic signal indicates that there is a red light; and
    the visual representation of the traffic signal depicts the red light.

12. The method of claim 1, further comprising:
    upon determining that the traffic signal or the traffic sign will not delay the pickup time by the at least the threshold amount, causing, by the one or more processors, the visual representation to be displayed concurrently with the map in the graphical user interface without the indication of the reason for the delay.

13. A computing system comprising:
    one or more processors configured to communicate with a vehicle having an autonomous driving mode and a computing device of a passenger, the one or more processors configured to:
    obtain vehicle status information about the vehicle when operating in the autonomous driving mode, the vehicle status information comprising information about a current trip associated with the passenger;
    obtain information about a traffic signal or a traffic sign that the vehicle is approaching in the autonomous driving mode;
    determine whether the traffic signal or the traffic sign will delay a pickup time for the passenger at a selected location by at least a threshold amount;
    and
    upon determining that the traffic signal or the traffic sign will delay the pickup time by the at least the threshold amount, cause a visual representation of the traffic signal or the traffic sign to be displayed concurrently with a map and an indication of a reason for the delay in a graphical user interface of the computing device of the passenger.

14. The computing system of claim 13, wherein the computing system comprises the computing device of the passenger.

15. The computing system of claim 13, wherein the computing system comprises a remote computing system in operative communication with the vehicle and the computing device of the passenger.

16. The computing system of claim 13, wherein causation of the visual representation to be displayed in the graphical user interface includes determination of when to display the visual representation according to a distance between the vehicle and the traffic signal or the traffic sign.

17. The computing system of claim 13, wherein the one or more processors are further configured to, upon determining that the traffic signal or the traffic sign will not delay the pickup time by the at least the threshold amount, cause the visual representation to be displayed concurrently with the map in the graphical user interface without the indication of the reason for the delay.

18. A non-transitory computer-readable medium storing instructions which, when executed, causes one or more processors of a computing device to perform a method comprising:

obtaining vehicle status information about a vehicle operating in an autonomous driving mode, the vehicle status information comprising information about a current trip associated with a passenger;

obtaining information about a traffic signal or a traffic sign that the vehicle is approaching in the autonomous driving mode;

determining whether the traffic signal or the traffic sign will delay a pickup time for the passenger at a selected location by at least a threshold amount; and upon determining that the traffic signal or the traffic sign will delay the pickup time, causing a visual representation of the traffic signal or the traffic sign to be displayed concurrently with a map and an indication of a reason for the delay in a graphical user interface of a computing device of the passenger.

19. The non-transitory computer-readable medium of claim 18, wherein the passenger is awaiting pickup by the vehicle.

20. The non-transitory computer-readable medium of claim 18, wherein the indication of the reason for the delay includes textual information that explains the information about the traffic signal or the traffic sign.

* * * * *